(12) United States Patent
Brennan

(10) Patent No.: US 11,008,770 B1
(45) Date of Patent: May 18, 2021

(54) RECONFIGURABLE SPA FILTER TREATMENT SYSTEMS AND METHODS FOR TREATING FILTERED WATER FOR SPAS AND HOT TUBS

(71) Applicant: SARATOGA SPA & BATH, INC., Latham, NY (US)

(72) Inventor: Anthony Brennan, Latham, NY (US)

(73) Assignee: SARATOGA SPA & BATH, INC., Latham, NY (US)

( * ) Notice: Subject to any disclaimer, the term of this patent is extended or adjusted under 35 U.S.C. 154(b) by 0 days.

(21) Appl. No.: 16/746,081

(22) Filed: Jan. 17, 2020

(51) Int. Cl.
*E04H 4/12* (2006.01)
*A61H 33/00* (2006.01)
(Continued)

(52) U.S. Cl.
CPC ....... *E04H 4/1281* (2013.01); *A61H 33/0087* (2013.01); *E04H 4/1218* (2013.01);
(Continued)

(58) Field of Classification Search
CPC . E04H 4/1281; E04H 4/1218; A61H 33/0087; B01D 27/08; B01D 11/02; C02F 1/766
(Continued)

(56) References Cited

U.S. PATENT DOCUMENTS 4,780,197 A * 10/1988 Schuman ............... B01D 29/21
 210/136
4,928,813 A * 5/1990 Casberg ................ B01F 1/0027
 206/0.5

(Continued)

FOREIGN PATENT DOCUMENTS

WO 2007120857 A2 10/2007
WO 2007134295 A1 11/2007
WO 2019032892 A1 2/2019

OTHER PUBLICATIONS

Frog Filter Mate, available from King Technology of Hopkins, Minnesota, printout on Oct. 24, 2019, available at https://www.kingtechnology.com/wp-content/uploads/download-manager-files/Filter-Mate-Manual.pdf, (Wayback Verification Crawl Presence dated Mar. 10, 2019), 7 pages, at least as early as Mar. 10, 2019.
(Continued)

*Primary Examiner* — Fred Prince
(74) *Attorney, Agent, or Firm* — Heslin Rothenberg Farley and Mesiti PC

(57) ABSTRACT

A method for treating water in a spa or hot tub includes, for example, supporting one or more water treatment dispensers from a supporting structure in an upper end of a filter cartridge disposed in a skimmer of the spa or the hot tub. A first dispenser includes a first water treatment material and the second dispenser includes a second different water treatment material. A supply of water is passed from the spa or hot tub into the skimmer and through the filter cartridge so that the first dispenser is disposed in the filtered water in the filter cartridge to dispense the first and/or the second water treatment materials from the first and/or dispensers, and a supply of treated filtered water from the filter cartridge to the spa or hot tub. One or more caps, for example, may be employed when the first and/or the second dispenser is not used.

28 Claims, 26 Drawing Sheets

(51) Int. Cl.
 *B01D 27/08* (2006.01)
 *C02F 1/76* (2006.01)
 *B01D 11/02* (2006.01)

(52) U.S. Cl.
 CPC .......... *B01D 11/0215* (2013.01); *B01D 27/08* (2013.01); *C02F 1/766* (2013.01)

(58) Field of Classification Search
 USPC .... 210/776, 167.11, 206, 753, 754; 422/277
 See application file for complete search history.

(56) References Cited

U.S. PATENT DOCUMENTS

| | | |
|---|---|---|
| RE35,900 E | 9/1998 | Meissner |
| 5,888,386 A * | 3/1999 | Enright .................. C02F 1/688 210/167.11 |
| 6,328,900 B1 | 12/2001 | King |
| 6,447,677 B2 | 9/2002 | King |
| 6,471,856 B1 | 10/2002 | Keith |
| 6,652,871 B1 | 11/2003 | King et al. |
| 6,685,843 B2 | 2/2004 | Leaverton |
| 6,751,814 B2 | 6/2004 | Mattson, Jr. et al. |
| 6,827,847 B1 | 12/2004 | Chauvier |
| 6,855,252 B2 | 2/2005 | Brandreth, III |
| 6,982,040 B2 | 1/2006 | Costa et al. |
| 7,059,540 B2 | 6/2006 | King et al. |
| 7,060,190 B2 | 6/2006 | King et al. |
| 7,067,056 B2 | 6/2006 | Collns |
| 7,238,278 B2 | 7/2007 | Coffey et al. |
| 7,329,345 B2 | 2/2008 | King et al. |
| 7,487,790 B2 | 2/2009 | King et al. |
| 8,273,254 B2 | 9/2012 | McCague |
| 8,366,922 B2 | 2/2013 | McCague |
| 8,431,021 B2 | 4/2013 | McCague |
| 8,585,967 B2 | 11/2013 | Snetting et al. |
| 8,617,481 B1 | 12/2013 | Snetting et al. |
| 9,398,769 B2 | 7/2016 | King et al. |
| 9,714,129 B2 | 7/2017 | Snetting et al. |
| 10,150,680 B1 | 12/2018 | Kurani et al. |
| 10,173,828 B2 | 1/2019 | Snetting et al. |
| 2002/0144958 A1 | 10/2002 | Sherman |
| 2004/0108262 A1* | 6/2004 | Brandreth, III ....... B01F 5/0496 210/206 |
| 2005/0081287 A1 | 4/2005 | Mattson, Jr. et al. |
| 2005/0211613 A1* | 9/2005 | King ....................... C02F 1/688 210/167.11 |
| 2005/0263445 A1 | 12/2005 | Collins |
| 2010/0264098 A1 | 10/2010 | Potukuchi |
| 2012/0074052 A1* | 3/2012 | Brandreth ............ B01D 37/025 210/206 |
| 2013/0228499 A1 | 9/2013 | Robinson |
| 2014/0113003 A1 | 4/2014 | King et al. |
| 2014/0369886 A1 | 12/2014 | King et al. |
| 2018/0112430 A1 | 4/2018 | Shalon et al. |
| 2018/0147510 A1 | 5/2018 | Hales et al. |
| 2019/0070531 A1 | 3/2019 | Medina et al. |

OTHER PUBLICATIONS

Frog Serene, In-Line System Operating Instructions, available from King Technology of Hopkins, Minnesota, printout on Sep. 25, 2019, available at https://www.kingtechnology.com/wp-content/uploads/download-manager-files/Frog-Serene-In-Line-Manual.pdf, (Wayback Verification Crawl Presence dated Feb. 11, 2019), 8 pages, at least as early as Feb. 11, 2019.

* cited by examiner

US 11,008,770 B1

RECONFIGURABLE SPA FILTER TREATMENT SYSTEMS AND METHODS FOR TREATING FILTERED WATER FOR SPAS AND HOT TUBS

FIELD OF THE DISCLOSURE

The present disclosure relates generally to spas and hot tubs, and more particularly to reconfigurable spa filter treatment systems and methods for treating filtered water for spas and hot tubs.

BACKGROUND

Conventional spa or hot tub filters include a solid top end cap, a bottom end cap having an opening, and a pleated filter disposed therebetween. Treatment of water in spas and hot tubs typical requires a user to test and add appropriately add water treatment materials to the water in the spa or hot tub.

SUMMARY

Shortcomings of the prior art are overcome and additional advantages are provided through the provision, in one embodiment, of a method for treating water in a spa or hot tub which includes, for example, supporting a first water treatment dispenser from a first opening in an upper end of a filter cartridge disposed in a skimmer of the spa or the hot tub, the filter cartridge having a filter medium defining a chamber, a lower portion of the first water treatment dispenser disposed in the chamber of the filter cartridge, and the first water treatment dispenser having a first water treatment material, and supporting a second water treatment dispenser from a second opening in the upper portion of the filter cartridge in the housing of the spa or the hot tub, a lower portion of the second water treatment dispenser disposed in the chamber of the filter cartridge, and the second water treatment dispenser having a second water treatment material different from the first water treatment material. A supply of water is passed from the spa or hot tub into the skimmer and through the filter medium of the filter cartridge so that the first water treatment dispenser and the second water treatment dispenser are disposed in the filtered water in the chamber of the filter cartridge to dispense the first and second water treatment materials from the first water treatment dispenser and the second water treatment dispenser during a first period of time. A supply of treated filtered water is returned from a lower end of the filter cartridge to the spa or hot tub during the first period of time.

In another embodiment, a method for treating water in a spa or hot tub is provided. The method includes, for example, supporting a first dispenser from a supporting structure in an upper end of a filter cartridge disposed in a skimmer of the spa or the hot tub, the filter cartridge having a filter medium defining a chamber, a lower portion of the first dispenser disposed in the chamber of the filter cartridge, and the first dispenser having a first water treatment material, passing a supply of water from the spa or hot tub into the skimmer and through the filter medium of the filter cartridge so that the first dispenser is disposed in the filtered water in the chamber of the filter cartridge to dispense the first water treatment materials from the first dispenser during a first period of time, and returning a supply of treated filtered water from a lower end of the filter cartridge to the spa or hot tub during the first period of time.

In another embodiment, a reconfigurable spa filter system receivable in a skimmer of a spa or hot tub for use in treating water in a spa or hot tub is provided. The reconfigurable spa filter system includes, for example, a filter cartridge having an upper portion, a bottom portion, and a surrounding filter medium disposed between a periphery of the upper portion and a periphery of the bottom portion to define a chamber therein. The upper portion has a first dispenser supporting structure for supporting a first dispenser having a first water treatment material in the chamber of the filter cartridge. The upper portion has a second dispenser supporting structure for supporting a second dispenser having a second water treatment material different from the first water treatment material in the chamber of the filter cartridge. When water from the spa or hot tub is directed into the skimmer and through the filter medium of the filter cartridge, the first dispenser and the second dispenser disposed in the filtered water in the chamber of the filter cartridge are operable to dispense the first and second water treatment materials from the first dispenser and the second dispenser, which treated filtered water is discharged from a lower end of the filter cartridge and into the spa or hot tub during the first period of time.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION

The present disclosure and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the disclosure in detail. It should be understood, however, that the detailed description and the specific examples, while indicating embodiments of the present disclosure, are given by way of illustration only, and are not by way of limitation. Various substitutions, modifications, additions and/or arrangements within the spirit and/or scope of the underlying concepts will be apparent to those skilled in the art from this disclosure. Reference is made below to the drawings, which are not drawn to scale for ease of understanding, wherein the same reference numbers used throughout different figures designate the same or similar components.

Generally, the reconfigurable spa filter treatment systems of the present disclosure provides a filter docking system and technology directed to filters cartridges disposable in a skimmer or filter housing of a spa or hot tub and adapted to receive one or more water treatment dispensers, such as a mineral water treatment dispenser and a sanitizer water treatment dispenser. For example, in some embodiments, the reconfigurable spa filter treatment systems may include pleated filter cartridges configured to receive a first sanitizer water treatment dispenser having bromine and a second mineral water treatment dispenser having silver. The reconfigurable spa filter treatment systems allows using either one of the water treatment dispensers, both of the water treatment dispensers, or neither of the water treatment dispenser, for example, based on the needed treatment of water in the spa or hot tub. The water treatment dispensers may be configured to be disposable or reusable.

Figure 1:
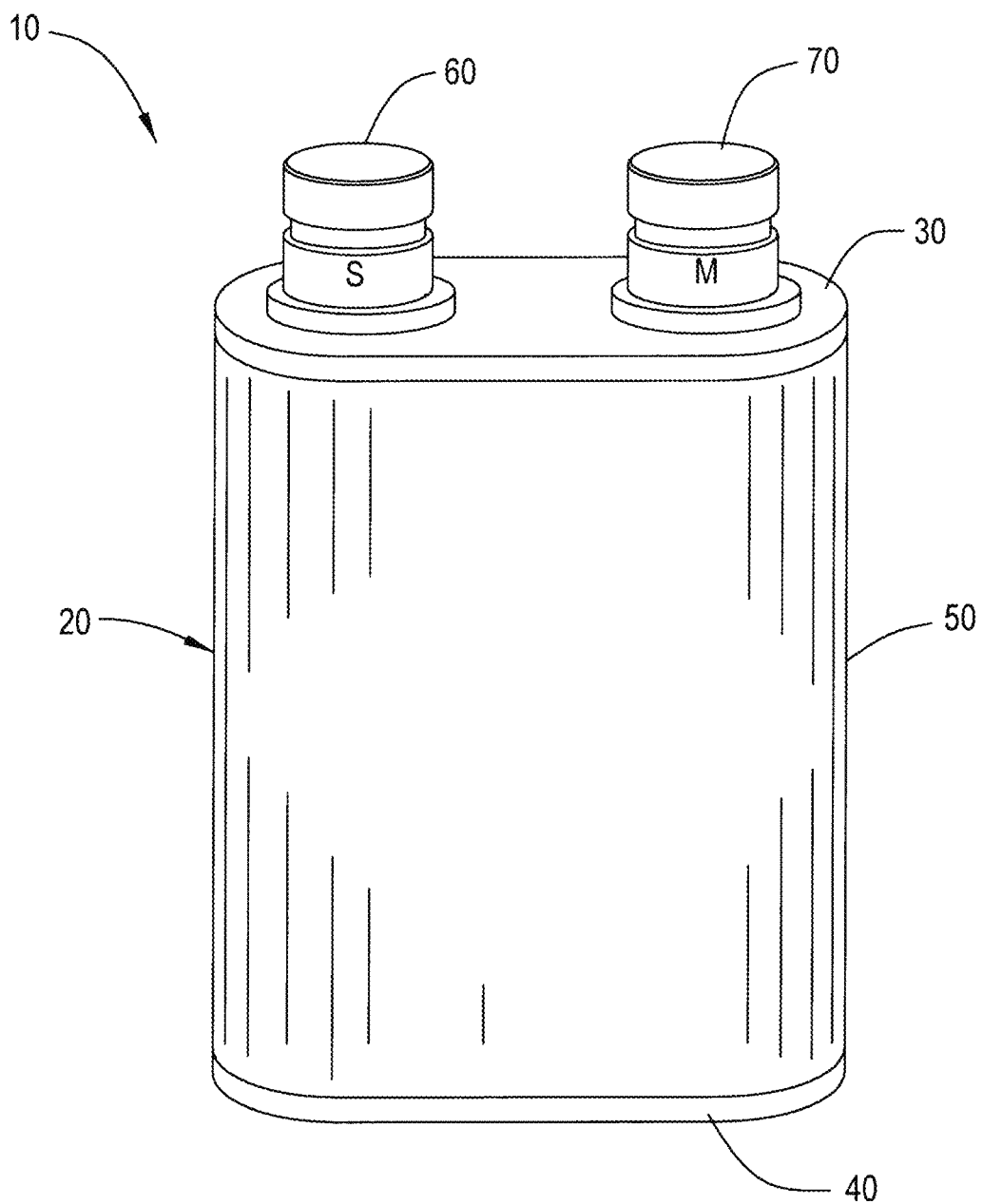
FIG. 1 is a perspective view of a reconfigurable spa filter treatment system disposed in a first configuration, according to an embodiment of the present disclosure.
Figure 5:
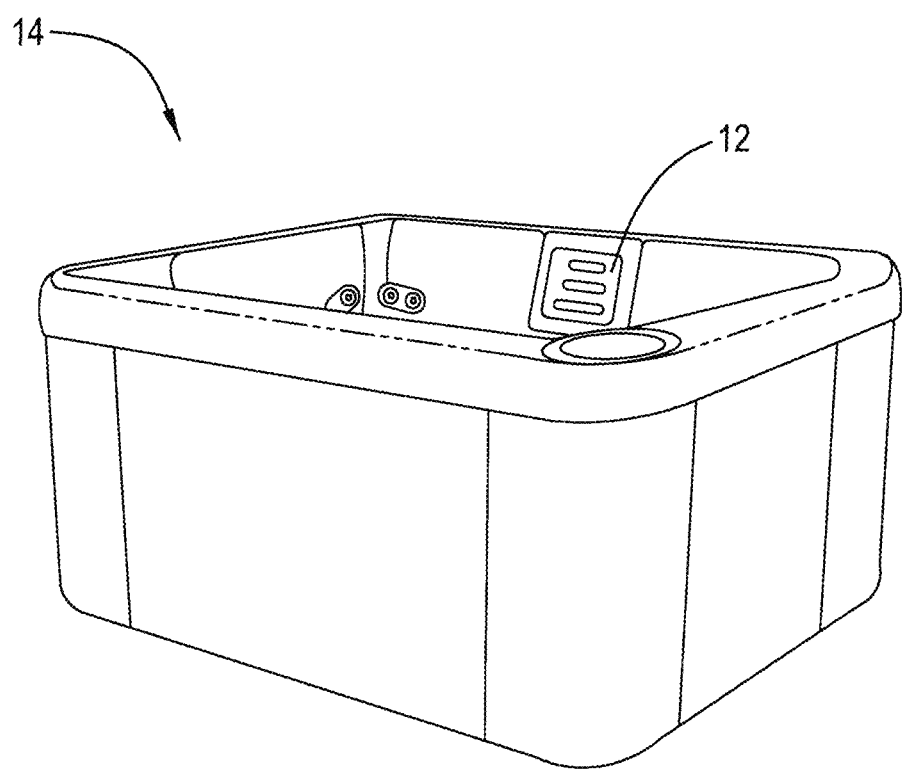
FIG. 5 is a perspective view of a spa or hot have a skimmer or filter housing for use with the reconfigurable spa filter treatment system of FIG. 1, according to an embodiment of the present disclosure.
Figure 6:
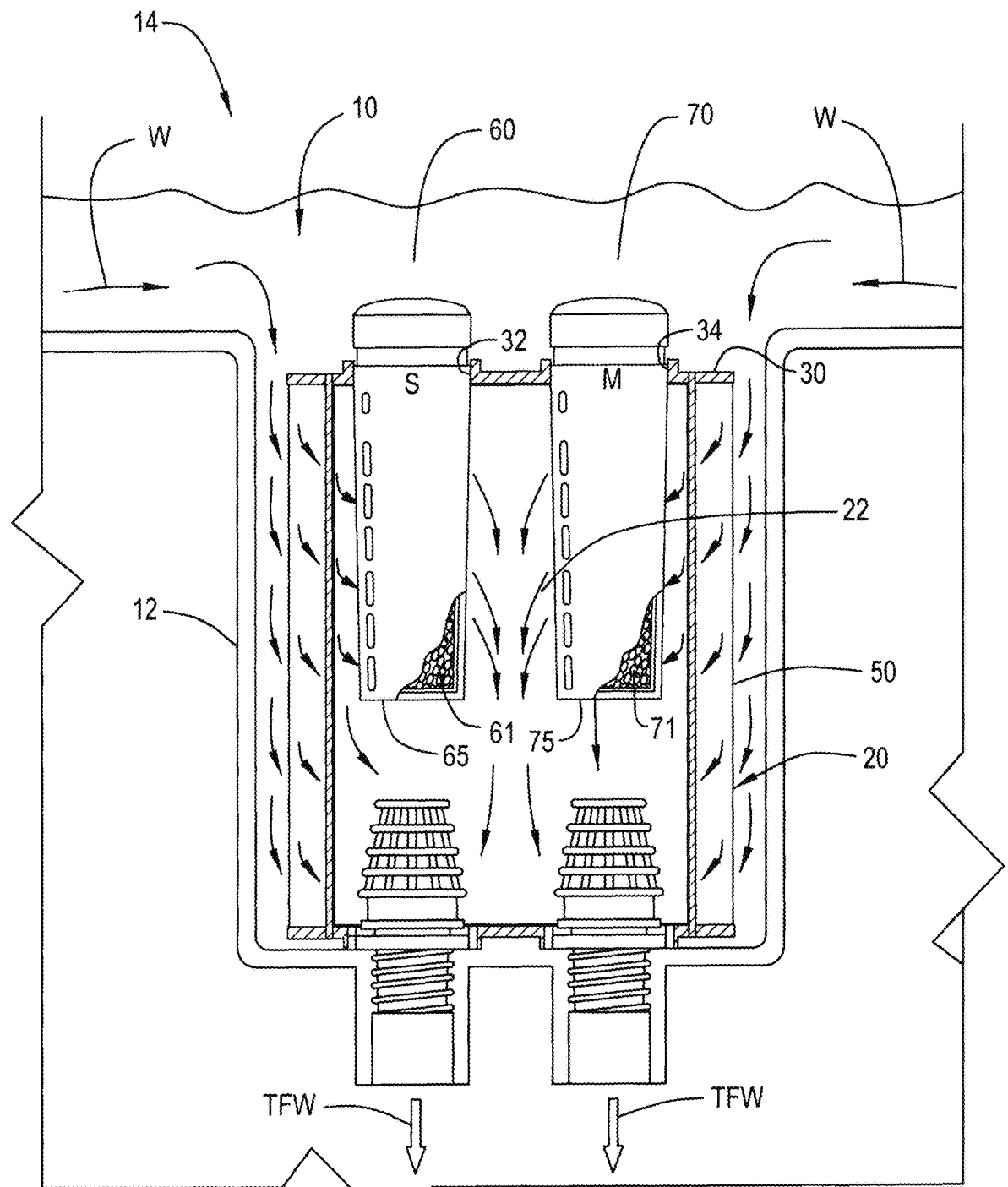
FIG. 6 is a side elevational view, in part cross-section, of the reconfigurable spa filter treatment system of FIG. 1 disposed the skimmer or filter housing, according to an embodiment of the present disclosure.

With reference to FIG. 1, therein illustrated is a reconfigurable spa filter treatment system 10 disposed in a first configuration, according to an embodiment of the present disclosure. In this illustrated embodiment, reconfigurable spa filter treatment system 10 generally includes a filter cartridge 20, a first water treatment dispenser 60, and a second water treatment dispenser 70. As shown in FIGS. 5 and 6, reconfigurable spa filter treatment system 10 (FIG. 6)

is disposable in a skimmer or filter housing 12 of a spa or hot tub 14 for filtering and treating water.

Figure 2:
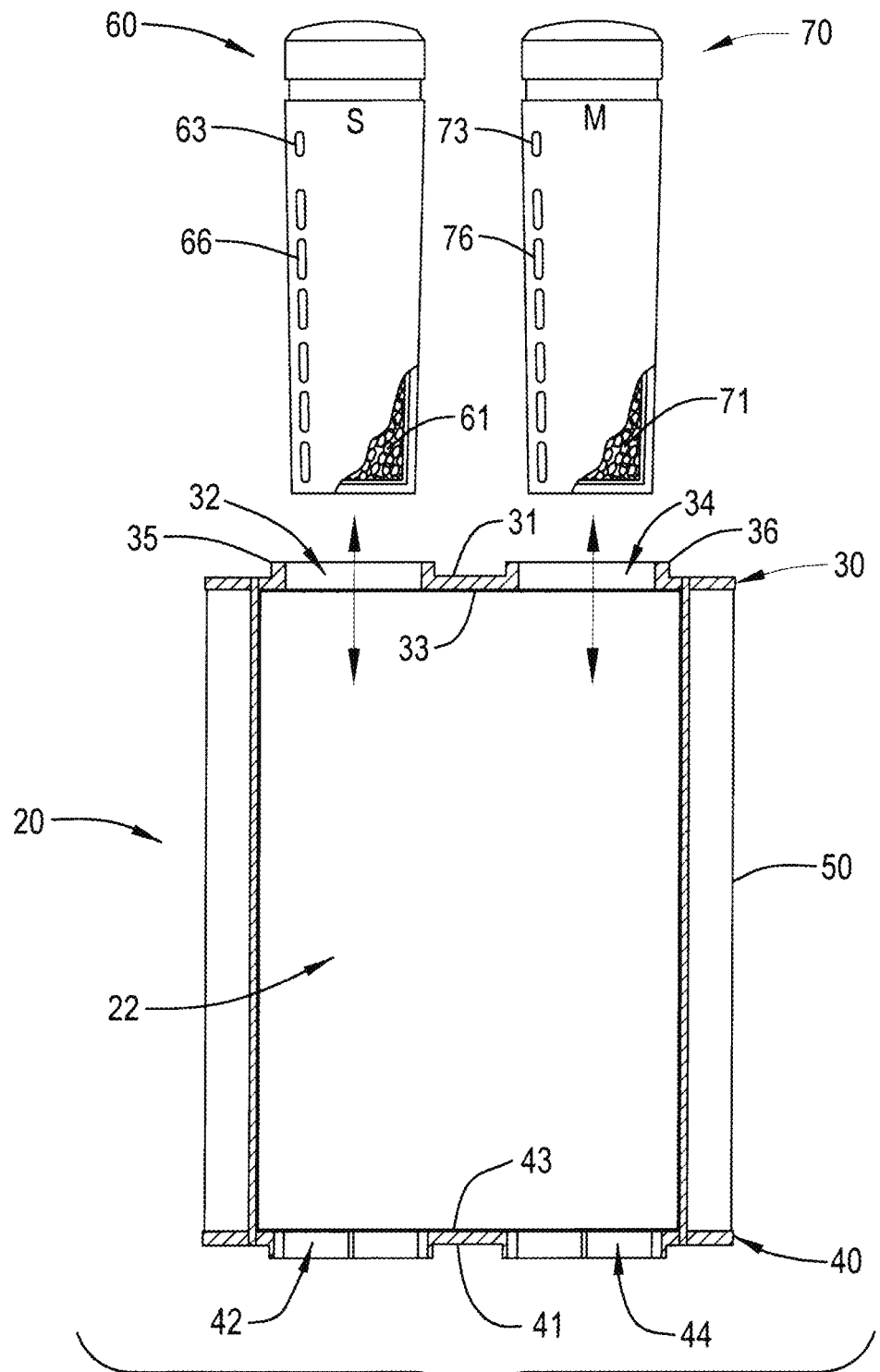
FIG. 2 is an exploded, side elevational view, in part cross-section, of the reconfigurable spa filter treatment system of FIG. 1, according to an embodiment of the present disclosure.

As shown in FIG. 2, in this exemplary embodiment, first water treatment dispenser 60 may include a first water treatment material 61, and second water treatment dispenser 70 may include a second water treatment material 71. In some embodiments, the first water treatment material may be different from the second water treatment material. For example, the first water treatment material may be a sanitizing material containing bromine as an active ingredient, and the second water treatment material may be a mineral material containing silver as an active ingredient. In some embodiments, first water treatment dispenser 60 and second water treatment dispenser 70 may be conventional disposable prefilled cartridges, such as mineral cartridges and sanitizer cartridges. Suitable first and second water treatment dispensers may include the first cartridge dispenser and second cartridge dispenser described and shown in U.S. Pat. No. 7,060,190, issued to King et al., the subject matter being incorporated herein by reference in its entirety.

With reference to FIGS. 1 and 2, in this illustrated embodiment, filter cartridge 20 may include an oblong top end cap 30, an oblong bottom end cap 40, and a surrounding filter medium 50 disposed between a peripheral portion of top end cap 30 and a peripheral portion of bottom end cap 40. For example, surrounding filter medium 50 may be a pleated filter medium.

Figure 3:
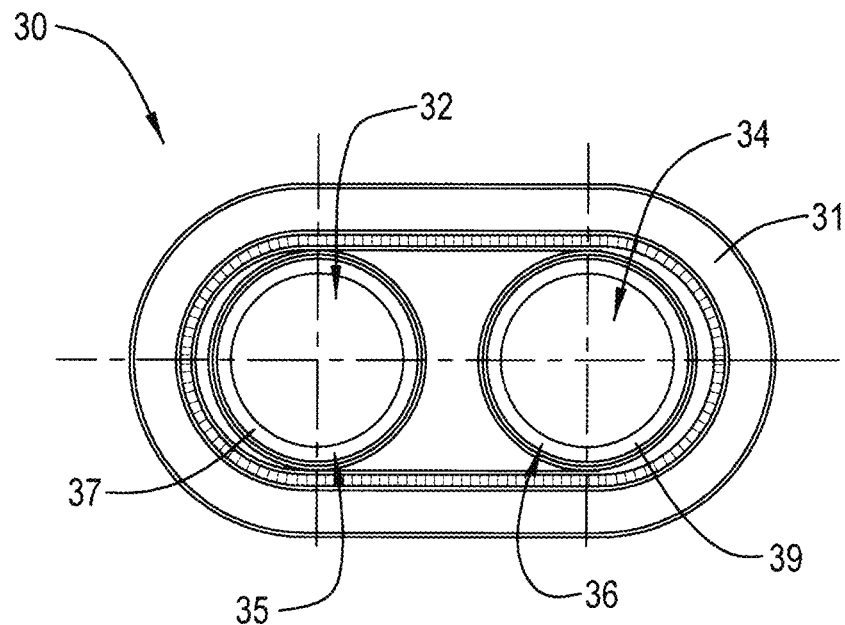
FIG. 3 is a top view of the filter cartridge of the reconfigurable spa filter treatment system of FIG. 1, according to an embodiment of the present disclosure.
Figure 4:
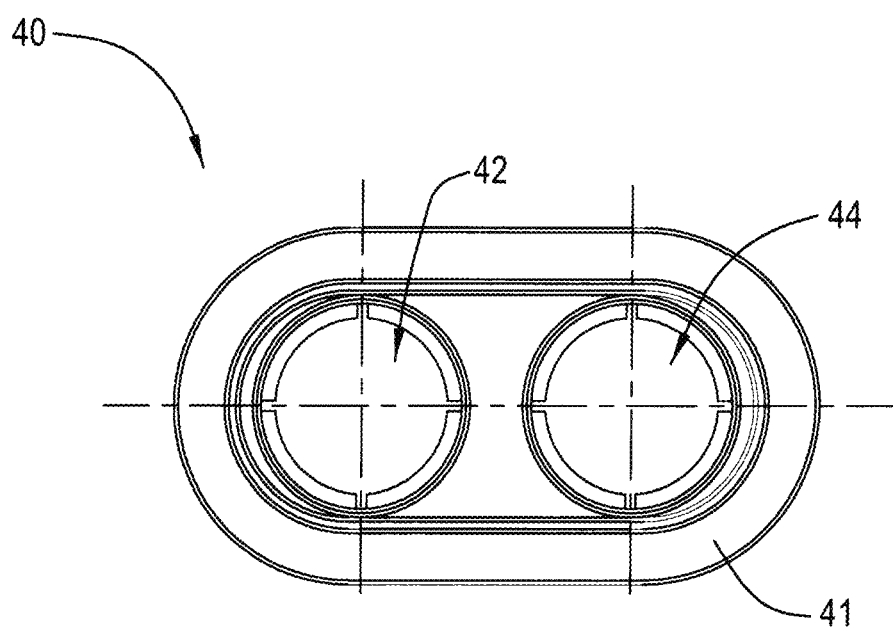
FIG. 4 is a bottom view of the filter cartridge of the reconfigurable spa filter treatment system of FIG. 1, according to an embodiment of the present disclosure.

As shown in FIG. 2, oblong top end cap 30, oblong bottom end cap 40, and surrounding filter medium 50 of filter cartridge 20 may define an elongate oblong chamber 22 therein. With reference to FIGS. 2 and 3, top end cap 30 includes a first opening 32 extending from a top surface 31 of top end cap 30 to a lower surface 33 (FIG. 2) of top end cap 30 and into oblong chamber 22 (FIG. 2). A raised collar 35 and 36 may be disposed around opening 32 and 34, respectively. With reference to FIGS. 2 and 4, bottom end cap 40 includes a first opening 42 extending from a bottom surface 41 to a top surface 43 (FIG. 2) of bottom end cap 40 and into oblong chamber 22 (FIG. 2), and bottom end cap 40 includes a second opening 44 extending from a bottom surface 41 to a top surface 43 (FIG. 2) of bottom end cap 40 and into oblong chamber 22 (FIG. 2).

With reference again to FIG. 2, top end cap 30 provides a support structure for water treatment dispenser 60 and second water treatment dispenser 70. For example, openings 32 and 34 in top end cap 30 are sized to receive and support upper portions of first water treatment dispenser 60 and second water treatment dispenser 70, respectively, as shown in FIG. 1. First water treatment dispenser 60 and second water treatment dispenser 70 may be operably tapered having a larger diameter upper portion sized larger than the diameter of the openings in the top end cap and a lower diameter portion sized less that the diameter of the openings in the top end cap. First and second water treatment dispensers 60 and 70 may be adjustable to regulate the dosing of the water treatment materials into the spa or hot tub. For example, first and second water treatment dispensers 60 and 70 may include a setting window 63 and 73, for adjusting vent openings 66 and 76, respectively, in the water treatment dispensers.

FIG. 6 illustrates reconfigurable spa filter treatment system 10 disposed in a first configuration in the skimmer or filter housing 12 of spa or hot tub 14, according to an embodiment of the present. As shown in FIG. 6, first water treatment dispenser 60 may have a tapered cylindrical body 65, the upper portion of which is supported in opening 32 in top end cap 30. Second water treatment dispenser 70 may have a tapered cylindrical body 75, the upper portion of which is supported in opening 34 in top end cap 30. The bottom ends of the first and second water treatment dispensers may be disposed above and spaced from the bottom of chamber 22 of filter cartridge 30. For example, the first and second water treatment dispenser may be disposed primarily in the upper half or entirely in the upper half of chamber 22 of filter cartridge 30.

Generally, an embodiment of the operation of reconfigurable spa filter treatment system 10 such as in the first configuration with first and second water treatment dispensers 60 and 70 as shown in FIG. 6, includes a supply of water W being passed from spa or hot tub 14 into skimmer or filter housing 12 and through filter medium 50 of the filter cartridge so that first water treatment dispenser 60 and second water treatment dispenser 70 are disposed in the filtered water in chamber 22 of filter cartridge 20 to dispense first and second water treatment materials 61 and 71 from first water treatment dispenser 60 and second water treatment dispenser 70, respectively. A supply of treated filtered water TFW from a lower end of filter cartridge 20 is returned to spa or hot tub 14.

Figure 7:
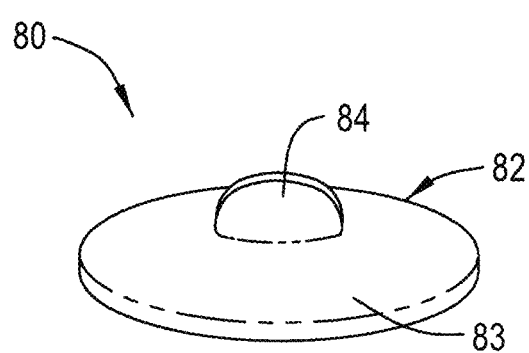
FIG. 7 is a top perspective view of a cover for use with the reconfigurable spa filter treatment system of FIG. 1, according to an embodiment of the present disclosure.
Figure 8:
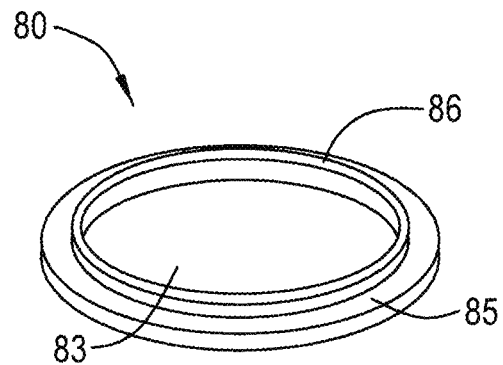
FIG. 8 is a bottom perspective view of the cover of FIG. 7, according to an embodiment of the present disclosure.

When one or more of the water treatment dispensers are not needed, for example, based to testing of the water in the spa of hot tub, the one or more water treatment dispensers may be removed from the filter cartridge that is disposed in a skimmer or filter housing of the spa or hot tub. With reference to FIGS. 7 and 8, reconfigurable spa filter treatment system 10 (FIG. 1) may include one or more covers 80 that may be used for covering the one or more openings in the filter cartridge when a water treatment dispenser is not needed or required, for example, based on testing of the water in the spa or hot tub.

Cover 80 may include a body 82 having a circular disc 83 with a raised tab or handle 84 (FIG. 7) and a downwardly-depending ring 86 (FIG. 8). A bottom peripheral edge portion 85 of cover 80 may be sized to rest on upper edge 37 or 39 (FIG. 3) of collars 35 or 36 (FIG. 3) disposed around top openings 32 and 34 (FIG. 3) in filter cartridge 20 (FIG. 1).

Figure 9:
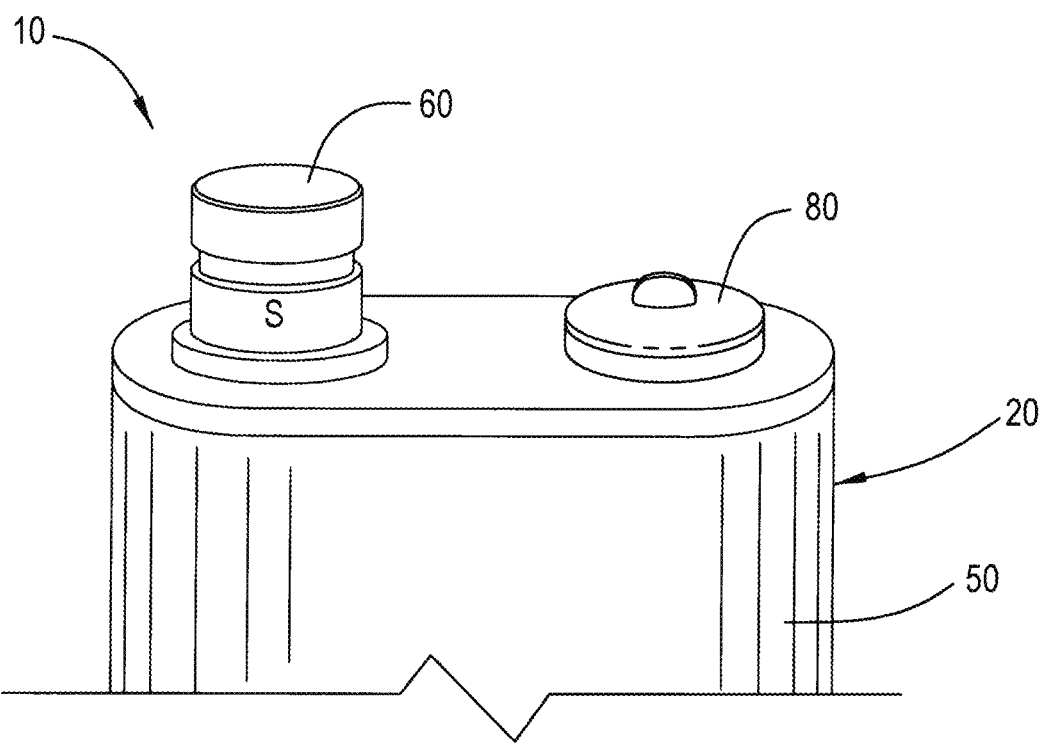
FIG. 9 is a partial perspective view of the reconfigurable spa filter treatment system of FIG. 1 disposed in a second configuration, according to an embodiment of the present disclosure.

With reference to FIG. 9, where the second water treatment material is not needed for treating the water in the spa or hot tub, for example, as determined by testing the water in the spa or hot tub, second water treatment dispenser 70 (FIG. 1) may be removed from the upper end of filter cartridge 20, and a first cover 80 is positioned over second opening 34 (FIG. 2) in the upper end of filter cartridge 20. In operation of reconfigurable spa filter treatment system 10 such as in this second configuration with first water treatment dispenser 60 and cover 80 as shown in FIG. 9, a supply of water is passed from the spa or hot tub into the skimmer or filter housing and through filter medium 50 of filter cartridge 20 so that first water treatment dispenser 60 is disposed in the filtered water in the chamber of filter cartridge 20 to dispense first water treatment material 61 (FIG. 5) from first water treatment dispenser 60. A supply of treated filtered water from a lower end of filter cartridge 20 is returned to the spa or hot tub.

Figure 10:
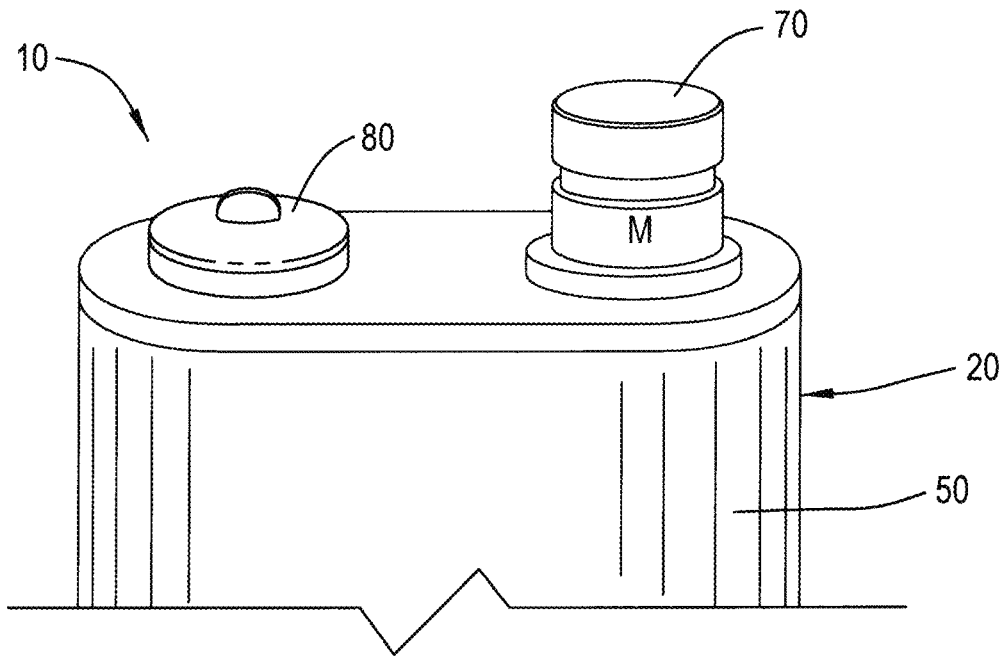
FIG. 10 is a partial perspective view of the reconfigurable spa filter treatment system of FIG. 1 disposed in a third configuration, according to an embodiment of the present disclosure.

As shown in FIG. 10, where the first water treatment material is not needed in the spa or hot tub, for example, as determined by testing the water in the spa or hot tub, first water treatment dispenser 60 (FIG. 1) may be removed from the upper end of filter cartridge 20, and a first cover 80 may be positioned over first opening 32 (FIG. 2) in the upper end of filter cartridge 20. In the operation of reconfigurable spa filter treatment system 10 such as in this third configuration with second water treatment dispenser 70 and cover 80 as shown in FIG. 10, a supply of water is passed from the spa or hot tub into the skimmer or filter housing and through filter medium 50 of filter cartridge 20 so that second water treatment dispenser 70 is disposed in the filtered water in the chamber of filter cartridge 20 to dispense second water treatment material 71 (FIG. 5) from second water treatment dispenser 70. A supply of treated filtered water from a lower end of filter cartridge 20 is returned to the spa or hot tub.

Figure 11:
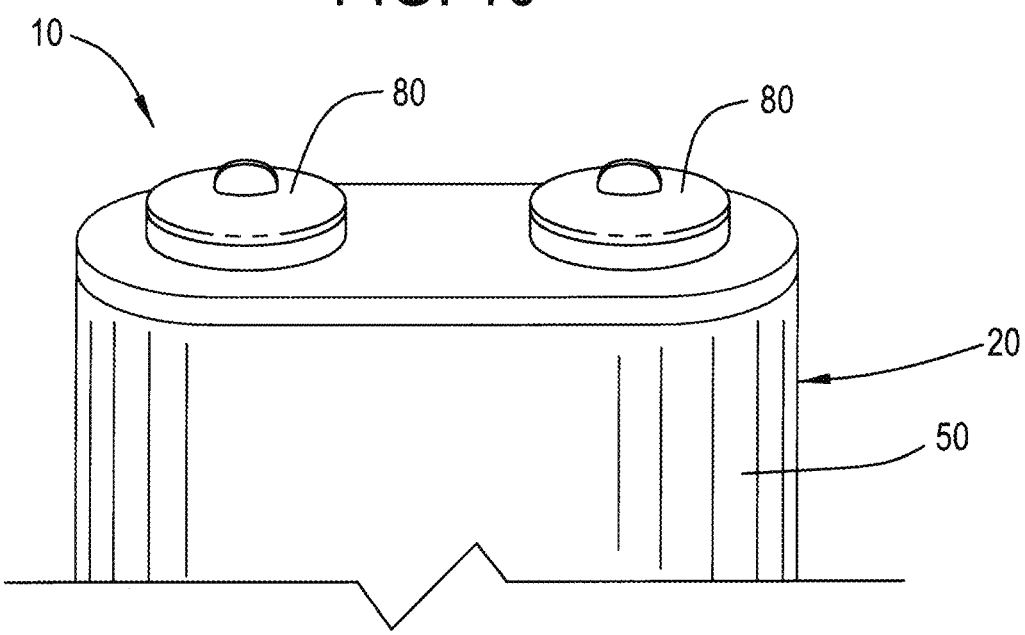
FIG. 11 is a partial perspective view of the reconfigurable spa filter treatment system of FIG. 1 disposed in a fourth configuration, according to an embodiment of the present disclosure.

With reference to FIG. 11, where neither the first nor second water treatment materials is needed in the spa or hot tub, for example, as determined by testing the water in the spa or hot tub or where water treatment conventionally performed, first water treatment dispenser 60 (FIG. 1) and second water treatment dispenser 70 (FIG. 1) may be removed from the upper end of filter cartridge 20, a first cover 80 may be positioned over first opening 32 (FIG. 2) in the upper end of filter cartridge 20, and a second cover 80 may be positioned over second opening 34 (FIG. 2) in the upper end of filter cartridge 20. In the operation of reconfigurable spa filter treatment system 10 such as in this fourth configuration with covers 80 as shown in FIG. 11, a supply of water is passed from the spa or hot tub into the skimmer or filter housing and through filter medium 50 of filter cartridge 20. A supply of untreated filtered water from a lower end of filter cartridge 20 is returned to the spa or hot tub. In this configuration, the reconfigurable spa filter treatment system acts as a conventional filter cartridge filtering water in the spa.

Figures 12, 13, 14:
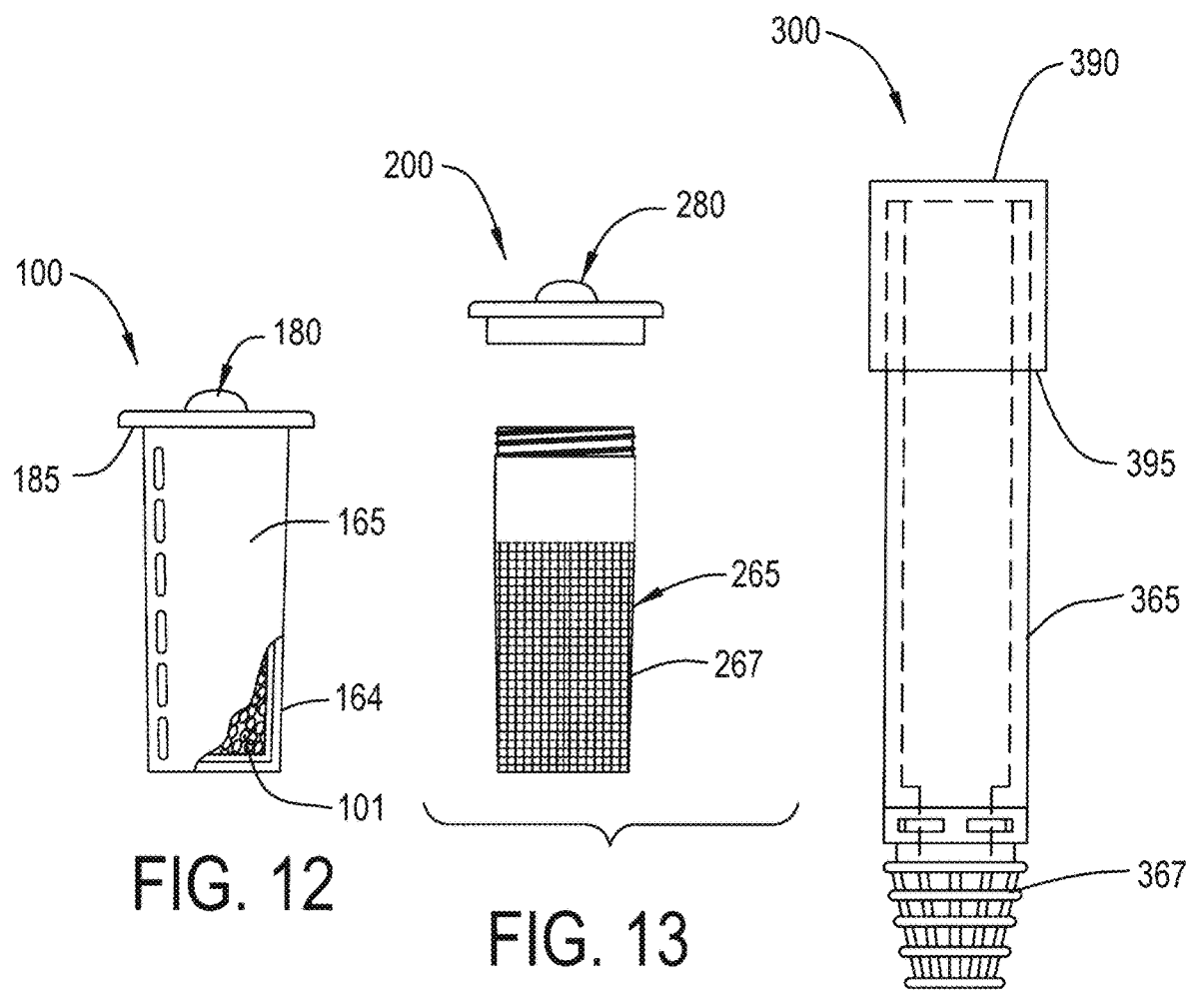
FIG. 12 is a side elevational view of a disposable water treatment dispenser, according to an embodiment of the present disclosure.
FIG. 13 is an exploded side elevational view of a reusable water treatment dispenser, according to an embodiment of the present disclosure.
FIG. 14 is a perspective view of a reusable water treatment dispenser, according to an embodiment of the present disclosure.

FIG. 12 illustrates a disposable water treatment dispenser 100, according to an embodiment of the present disclosure. In this illustrated embodiment, water treatment dispenser 100 may include a cover 180 fixedly attached to a container body having an outer container 165 and an inner container 164 with adjustable cooperating vent openings. A peripheral edge portion 185 may rest and be supported on a portion of a top end cap defining a support opening. Disposable water treatment dispenser 100 may include a water treatment material 101 such as a sanitizer material having bromine as an active ingredient or a mineral material having silver as an active ingredient.

FIG. 13 illustrates a refillable water treatment dispenser 200, according to an embodiment of the present disclosure. In this illustrated embodiment, water treatment dispenser 200 may include a releasable cover 280 releasably attachable to a container body 265 such as a basket 267. A peripheral edge portion 285 may rest and be supported on a portion of a top end cap defining a support opening. Refillable water treatment dispenser 200 may be filled with a water treatment material such as a sanitizer material having bromine as an active ingredient, a mineral material having silver as an active ingredient, or other spa sanitizers, minerals or chemicals. The water treatment material may be in the form of tablets. For example, cover 280 may be threadably attachable to body 265, attachable in a snap fit manner, or releasably connectable any suitable manner.

FIG. 14 illustrates a refillable water treatment dispenser 300, according to an embodiment of the present disclosure. In this illustrated embodiment, water treatment dispenser 300 may include an elongated hollow cylindrical body 365 and a basket 367 sized to be received in and pass through one or more support opening in an upper end of a filer cartridge. A hollow cylindrical cover 390 may be operably releasably connectable to an upper portion of body 365. Cover 390 may be sized larger than body 365 so that a lower peripheral end 395 may be rested and supported on the portion of the upper portion of the filter cartridge defining the support openings. Refillable water treatment dispenser 300 may be filled with a water treatment material such as a sanitizer material having bromine as an active ingredient, a mineral material having silver as an active ingredient, or other spa sanitizers, minerals or chemicals. The water treatment material may be in the form of tablets. For example, cover 390 may be threadably attachable to body 365, attachable in a snap fit manner, or releasably connectable any suitable manner.

Figure 15:
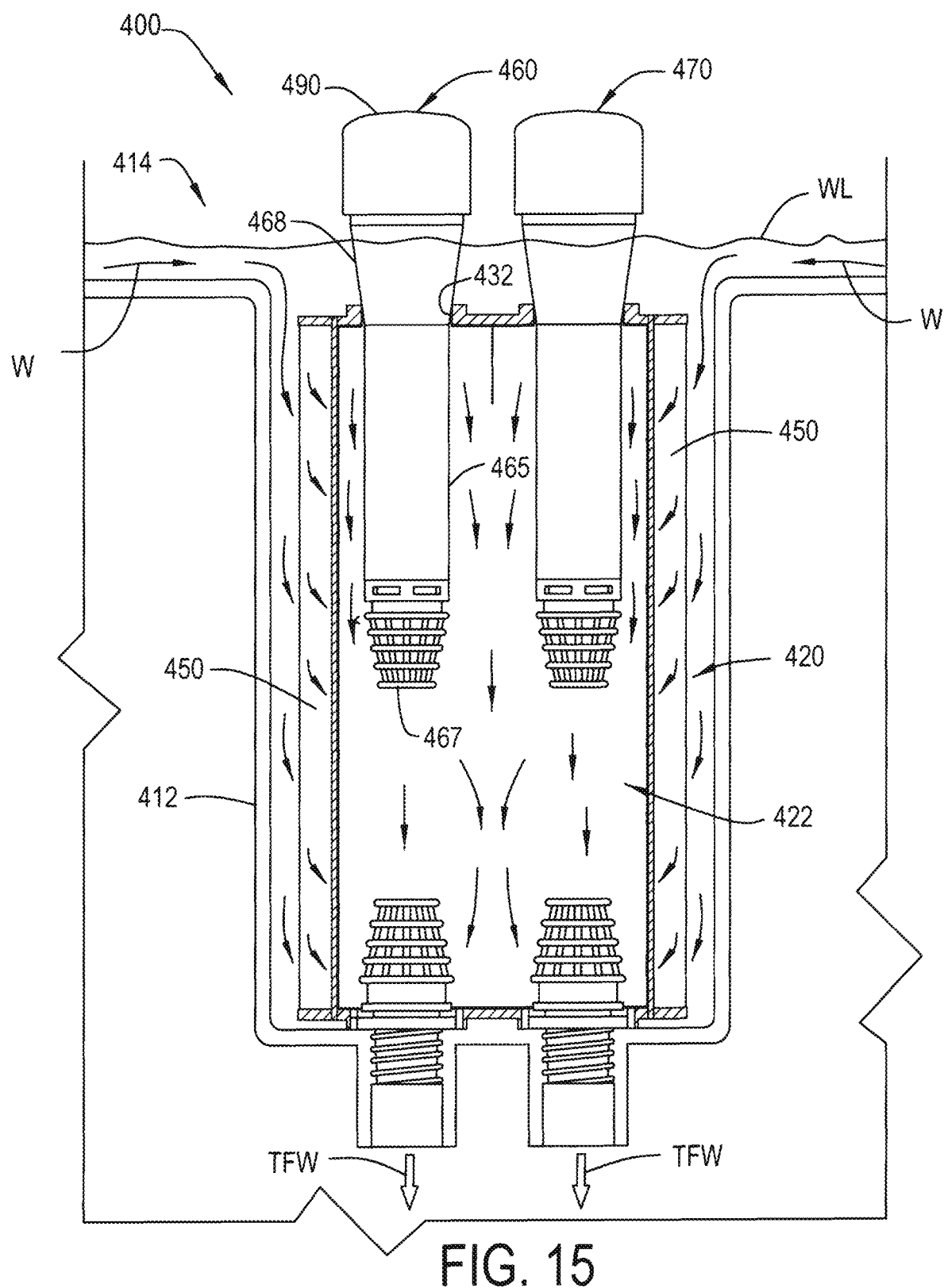
FIG. 15 is a side elevational view, in part cross-section, of a reconfigurable spa filter treatment system, according to an embodiment of the present disclosure.

FIG. 15 illustrates a reconfigurable spa filter treatment system 400 disposed in a first configuration in a skimmer or filter housing 412 of a spa or hot tub 414, according to an embodiment of the present. In this illustrated embodiment, reconfigurable spa filter treatment system 400 generally includes a filter cartridge 420, a first water treatment dispenser 460, and a second water treatment dispenser 470. Reconfigurable spa filter treatment system 400 is disposable in the skimmer or filter housing of the spa or hot tub for filtering and treating water in the spa or hot tub.

First water treatment dispenser 460 may include a first water treatment material, and second water treatment dispenser 470 may include a second water treatment material different from the first water treatment material. In some embodiments, the first water treatment material may be a sanitizing material containing bromine as an active ingredient, and the second water treatment material may be a mineral material containing silver as an active ingredient.

In this illustrated embodiment, first water treatment dispenser 460 may include an elongated hollow cylindrical body 465 and a basket 467 sized to be received in and pass through a support opening 432 in an upper end of filer cartridge 420. A hollow cylindrical collar 468 may be operably connected to an upper portion of body 465. Hollow collar 468 may be tapered and sized larger than body 465 so that a lower peripheral end portion may be supported on the portion of the upper portion of the filter cartridge defining a support opening. A removable cover 490 may be releasably attachable to collar 490.

In this illustrated embodiment, removable cover 490 of first water treatment dispenser 460 is supportable above a water line WL in skimmer or filter housing 412 of spa or hot tub 414 with a lower portion of first water treatment dispenser disposed in chamber 422 of filter cartridge 420. Second water treatment dispenser 470 may be essentially the same first water treatment dispenser 460. First water treatment dispenser 460 may be filled with a water treatment material such as a sanitizer material having bromine as an active ingredient. Second water treatment dispenser 470 may be filled with a water treatment material such as a mineral material having silver as an active ingredient. It will be appreciated that the dispensers may include other water treatment materials such as spa sanitizers, minerals or chemicals. The water treatment material may be in the form of tablets. For example, removable cover 490 may be threadably attachable to collar 468, attachable in a snap fit manner, or releasably connectable any suitable manner.

Generally, an embodiment of the operation of reconfigurable spa filter treatment system 400 such as in the first configuration with first and second water treatment dispensers 460 and 470 as shown in FIG. 15, may include supplying water W from spa or hot tub 414 into skimmer or filter housing 412 and through filter medium 450 of filter cartridge 420 so that first water treatment dispenser 460 and second water treatment dispenser 470 are disposed in the filtered water in chamber 422 of filter cartridge 420 to dispense the first and second water treatment materials from first water treatment dispenser 460 and second water treatment dispenser 460. A supply of treated filtered water TFW from a lower end of filter cartridge 420 is returned to spa or hot tub 414.

Adding water treatment materials may be readily accomplished by a user without removing reconfigurable spa filter treatment system 400 from skimmer or filter housing 412 and without removing first water treatment dispenser 460 and second water treatment dispenser 470 from filter cartridge 420, according to an embodiment of the present disclosure. For example, first removable cover 490 disposed above water line WL may be removed from the upper portion of first water treatment dispenser 460. A supply of the first water treatment material may be passed through the upper portion of first water treatment dispenser 460 and into the lower portion of first water treatment dispenser 460. Thereafter, removable cover 490 may be reattached to the upper portion of first water treatment dispenser 460. Regarding second water treatment dispenser 470, a second removable cover disposed above the water line WL may be removed from the upper portion of second water treatment dispenser 470. A supply of the second water treatment material may be passed through the upper portion of second water treatment dispenser 470 and into the lower portion of second water treatment dispenser 470. Thereafter, the removable cover may be reattached to the upper portion of second water treatment dispenser 470. Such a reconfigurable spa filter treatment system 400 allows a user to fill the water treatment dispensers without removal of reconfigurable spa filter treatment system 400, without removal of the first and second water treatment dispenser, and without the user getting wet. Removal of the removable covers may also allow a user to readily check the level of the water treatment materials.

Reconfigurable spa filter treatment system 400 may include a plurality of covers 80 (FIGS. 6 and 7) allowing user to use first water treatment dispenser 460 without second water treatment dispenser 470 and a cover covering the opening for second water treatment dispenser 470, use second water treatment dispenser 470 without first water treatment dispenser 460 and a cover covering the opening for first water treatment dispenser 460, and without both first water treatment dispenser 460 and second water treatment dispenser 470 and with covers covering both the openings for first water treatment dispenser 460 and second water treatment dispenser 470, as similarly described above regarding reconfigurable spa filter treatment system 100 (FIG. 1).

Figure 16:
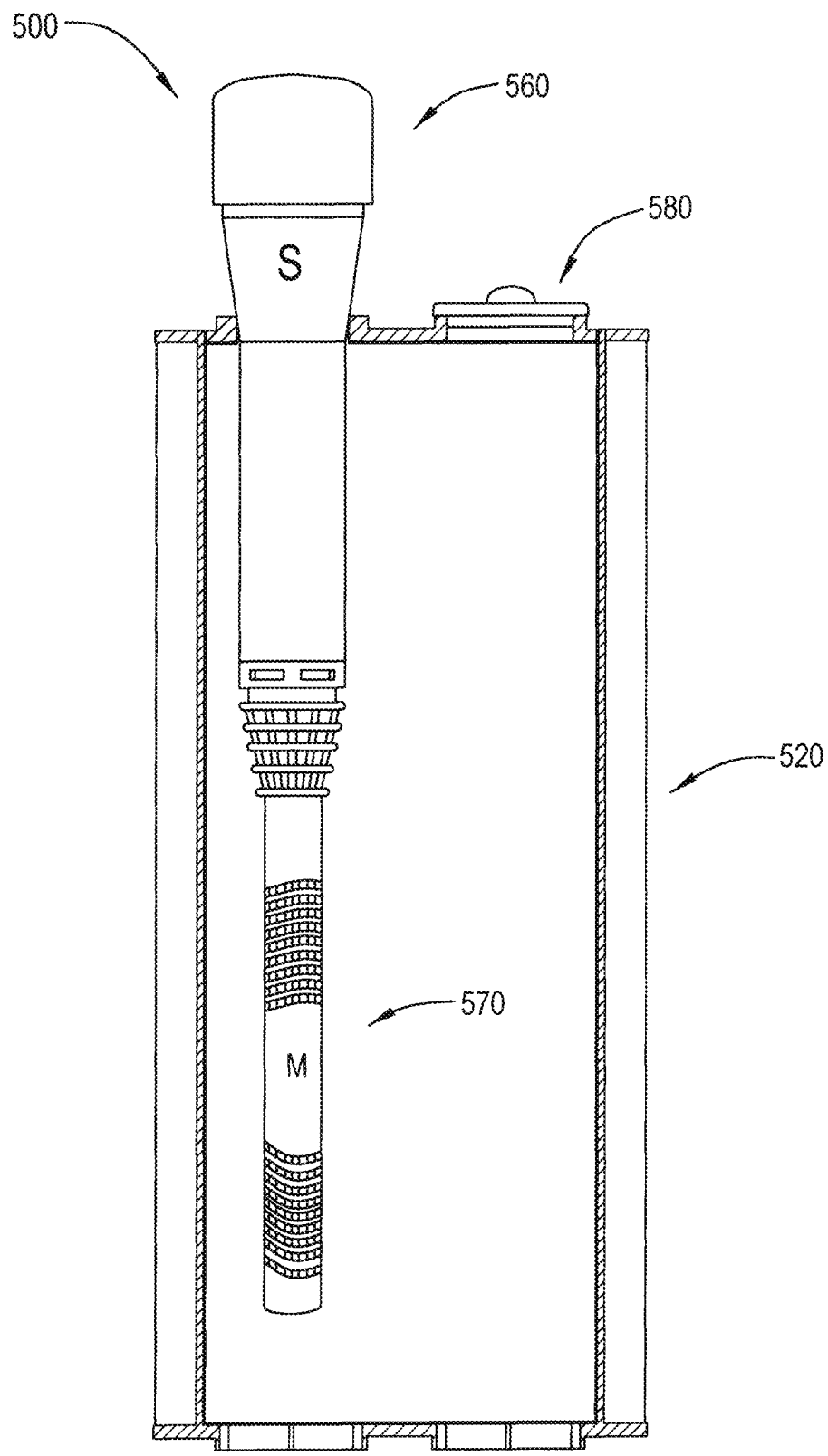
FIG. 16 is a side elevational view, in part cross-section, of a reconfigurable spa filter treatment system, according to an embodiment of the present disclosure.

FIG. 16 illustrates a reconfigurable spa filter treatment system 500 operably disposable in a first configuration in a skimmer or filter housing of a spa or hot tub, according to an embodiment of the present. In this illustrated embodiment, reconfigurable spa filter treatment system 500 generally includes a filter cartridge 520, a first water treatment dispenser 560, a stick water treatment dispenser 570, and a cover 580. Reconfigurable spa filter treatment system 500 is disposable in the filter housing of the spa or hot tub for filtering and treating water in the spa or hot tub.

Figure 17:
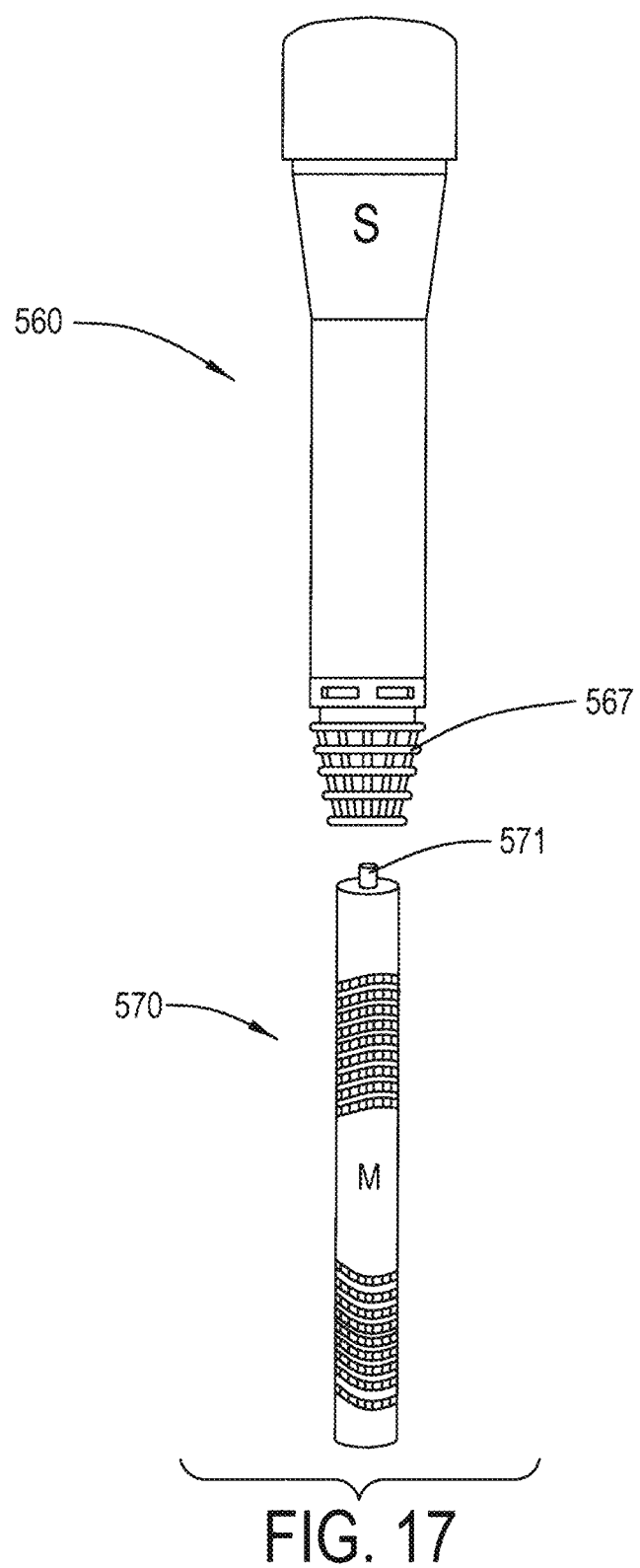
FIG. 17 is an exploded, side elevational view of the reusable water treatment dispenser and a stick water treatment dispenser of FIG. 15, according to an embodiment of the present disclosure.

First water treatment dispenser 560 may include a first water treatment material, and stick water treatment dispenser 570 may include a second water treatment material different from first water treatment material. In some embodiments, the first water treatment material may be a sanitizing material containing bromine as an active ingredient, and the second water treatment material may be a mineral material containing silver as an active ingredient. In some embodiments, the stick water treatment dispenser may be a Nature2 SPA Stick Mineral sanitizer, available from Zodiac Pool Systems, Inc., of Vista, Calif., containing silver as an active ingredient. As shown in FIG. 17, stick water treatment dispenser 570 may include a post 571 that is receivable in an opening in basket 567.

Figure 18:
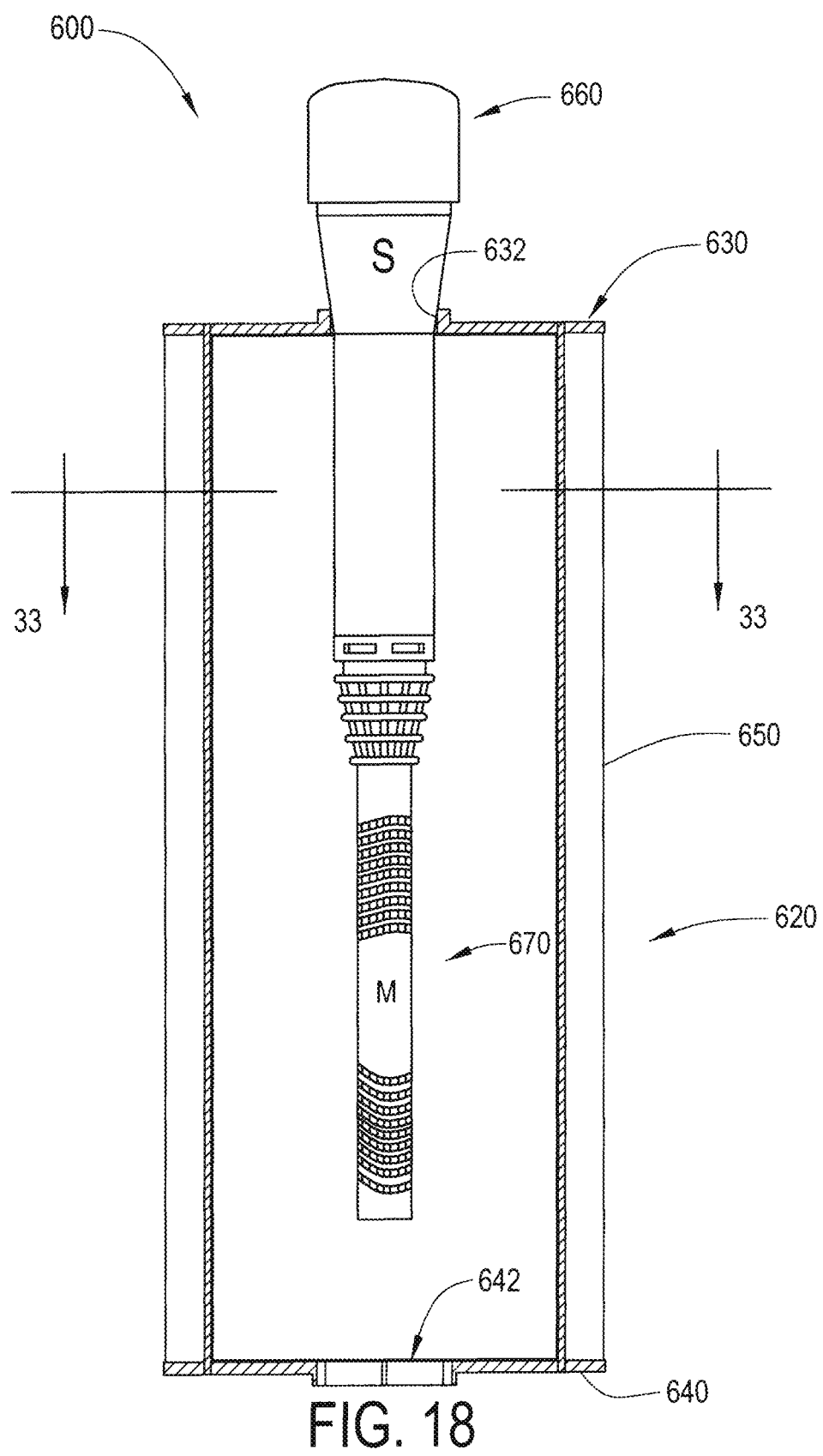
FIG. 18 is a side elevational view, in part cross-section, of the reconfigurable spa filter treatment system, according to an embodiment of the present disclosure.
Figure 33:
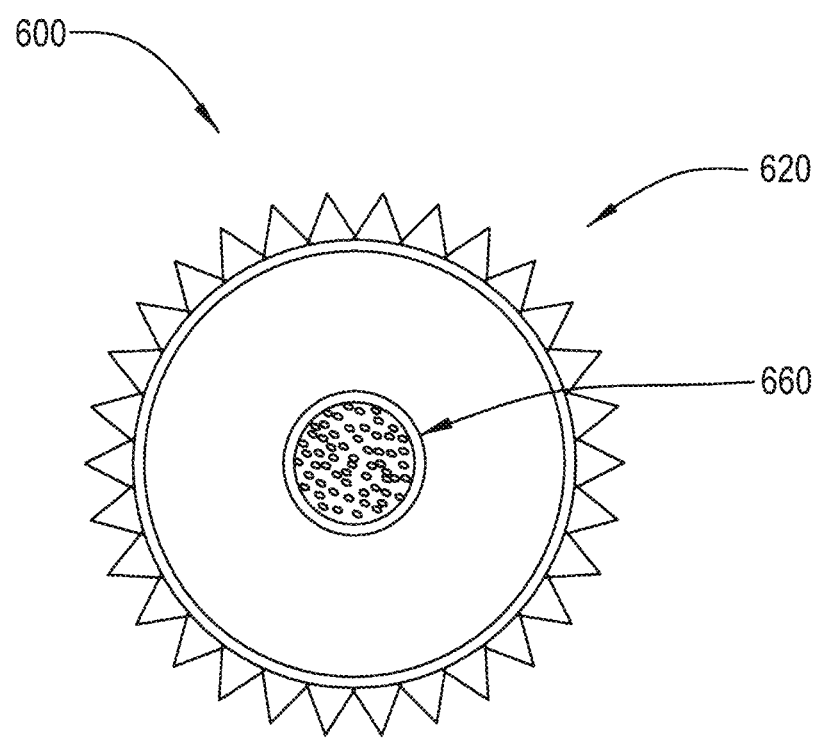
FIG. 33 is a cross-sectional view taken along line 33-33 in FIG. 18, according to an embodiment of the present disclosure.

FIG. 18 illustrates a reconfigurable spa filter treatment system 600 disposed in a first configuration operably disposable in a skimmer or filter housing of a spa or hot tub, according to an embodiment of the present. In this illustrated embodiment, as shown in FIGS. 18 and 33, the reconfigurable spa filter treatment system 600 generally includes an elongated cylindrical filter cartridge 620, a first water treatment dispenser 660, and a stick water treatment dispenser 670 (FIG. 18). Reconfigurable spa filter treatment system 600 is disposable in the filter housing of the spa or hot tub for filtering and treating water in the spa or hot tub.

In this illustrated embodiment, filter cartridge 620 includes a top end cap 630 having an upper opening 632 and a lower end cap 640 having a lower opening 642, and pleated filter medium 650. Top end cap 630, bottom end cap 640, and filter cartridge may have cylindrical cross-sections, and openings 632 and 642 may be cylindrical openings. First water treatment dispenser 660 may be similar to first water treatment dispenser 560 (FIG. 16) and stick water treatment dispenser 670 may be similar to stick water treatment dispenser 570 (FIG. 16).

Figure 19:
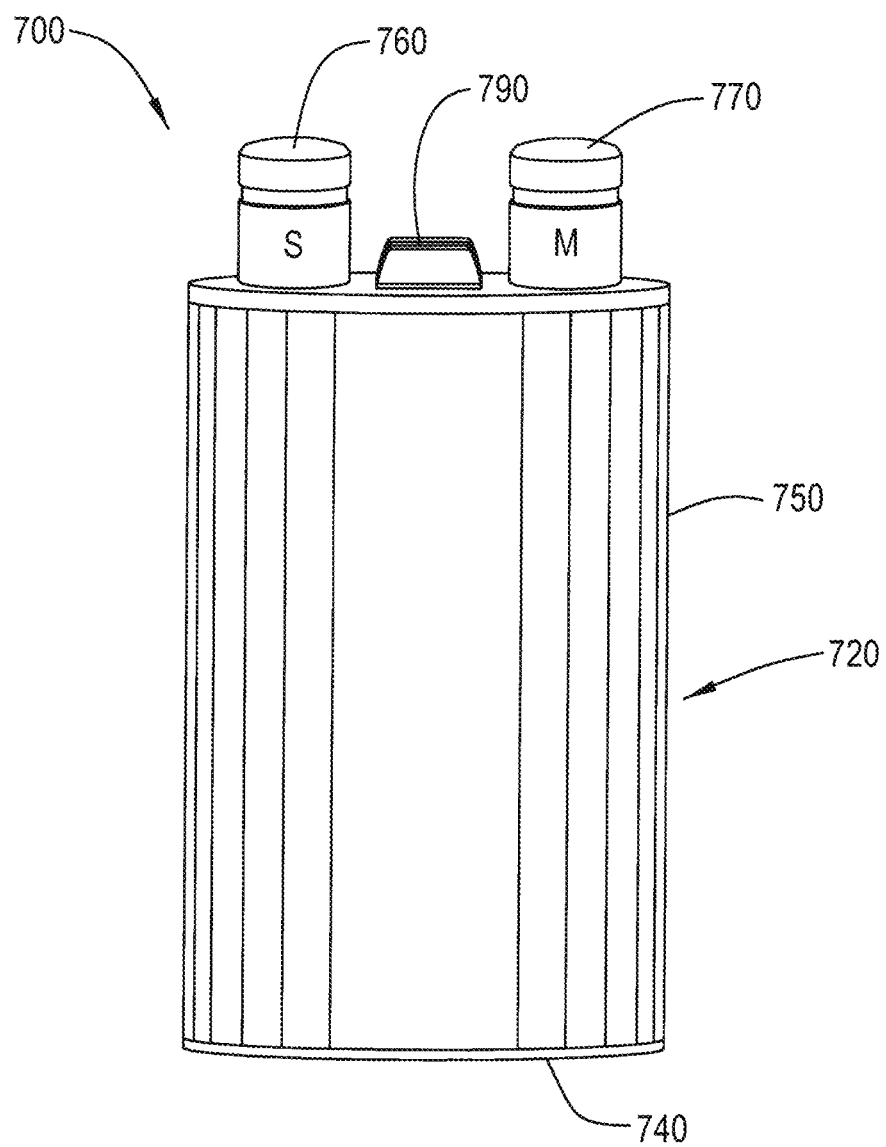
FIG. 19 is a perspective side elevational view of a reconfigurable spa filter treatment system, according to an embodiment of the present disclosure.

Referring now to FIG. 19, therein illustrated is a reconfigurable spa filter treatment system 700 disposed in a first configuration, according to an embodiment of the present disclosure. In this illustrated embodiment, reconfigurable spa filter treatment system 700 generally includes a filter cartridge 720, a first water treatment dispenser 760, a second water treatment dispenser 770, and a lid 790. Reconfigurable spa filter treatment system 700 is disposable in a skimmer or filter housing of a spa or hot tub for filtering and treating water. In the various embodiments, the filter cartridges and filter end caps may have a circular, oblong, or other suitable cross-section for supporting two or more water treatment systems.

In this exemplary embodiment, first water treatment dispenser 760 may include a first water treatment material, and second water treatment dispenser 770 may include a second water treatment material. In some embodiments, the first water treatment material may be different from the second water treatment material. For example, the first water treatment material may be a sanitizing material containing bromine as an active ingredient, and the second water treatment material may be a mineral material containing silver as an active ingredient. In some embodiments, first water treatment dispenser 760 and second water treatment dispenser 770 may be conventional disposable prefilled cartridges, such as mineral cartridges and sanitizer cartridges. Suitable first and second water treatment dispensers may include the first cartridge dispenser and second cartridge dispenser described and shown in U.S. Pat. No. 7,060,190, issued to King et al., subject matter being incorporated herein by reference in its entirety.

Figure 20:
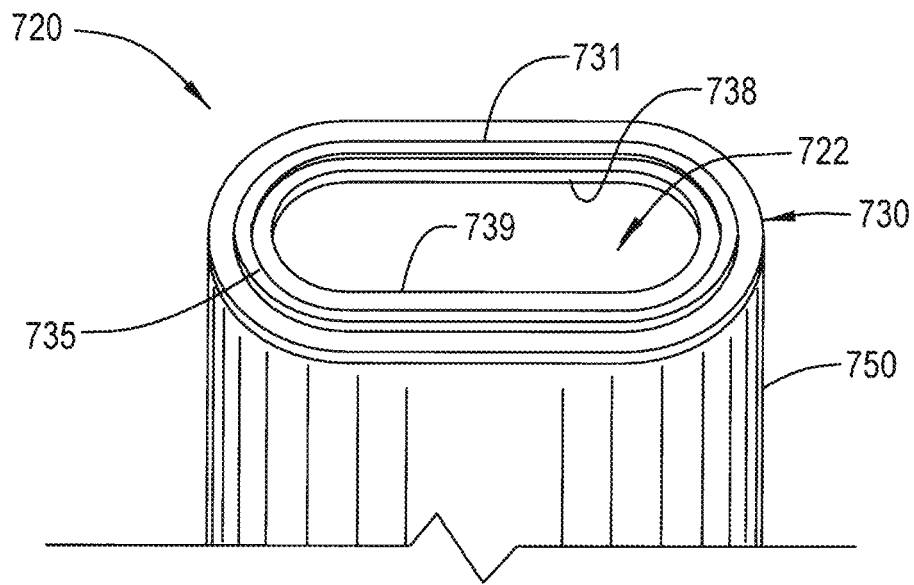
FIG. 20 is a perspective top view of the filter cartridge of the reconfigurable spa filter treatment system of FIG. 19, according to an embodiment of the present disclosure.

As shown in FIG. 20, in this illustrated embodiment, filter cartridge 720 may include an oblong top end cap 730, an oblong bottom end cap 740 (FIG. 19), and a surrounding filter medium 750 disposed between a periphery of top end cap 730 and a periphery of bottom end cap 740 (FIG. 19). For example, surrounding filter medium 750 may be a pleated filter medium. Oblong top end cap 730, oblong bottom end cap 740 (FIG. 19), and surrounding filter medium 750 of filter cartridge 720 defines an elongate oblong chamber 722 therein. Top end cap 730 includes an oblong opening 738 extending from a top surface 731 of top end cap 730 to a lower surface (not shown in FIG. 20) of top end cap 730 and into oblong chamber 722. A raised ridge 735 may be spaced from and disposed around opening 738 to define an inwardly-extending lip 739. The bottom end cap 740 (FIG. 19) may include a first opening extending from a bottom surface to a top surface of bottom end cap 740 (FIG. 19) and into oblong chamber 722.

Figure 21:
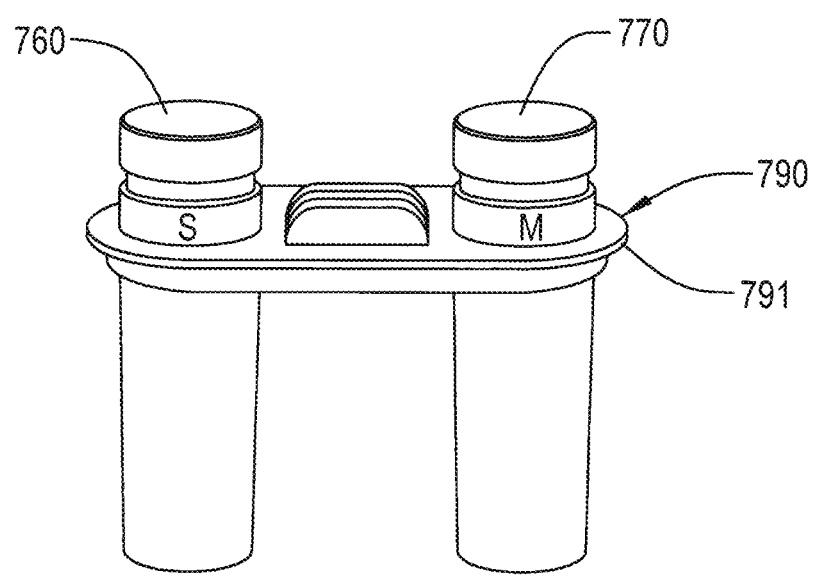
FIG. 21 is a perspective side view of the first water treatment dispenser, the second water treatment dispenser, and the lid of the reconfigurable spa filter treatment system of FIG. 19, according to an embodiment of the present disclosure.
Figure 22:
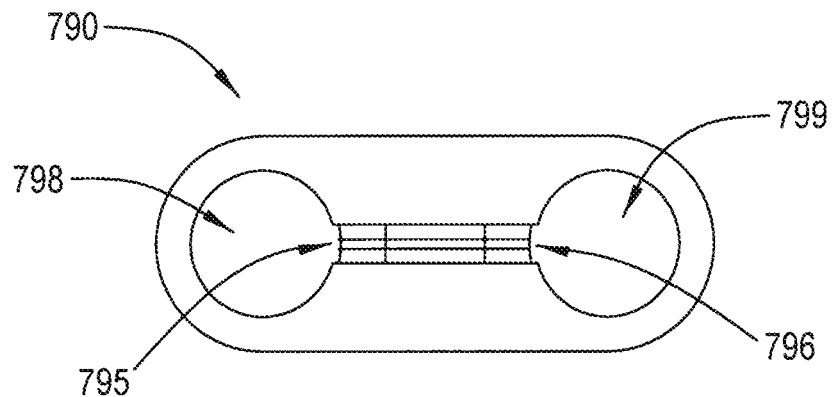
FIG. 22 is a top view of the lid of FIG. 21, according to an embodiment of the present disclosure.
Figure 23:
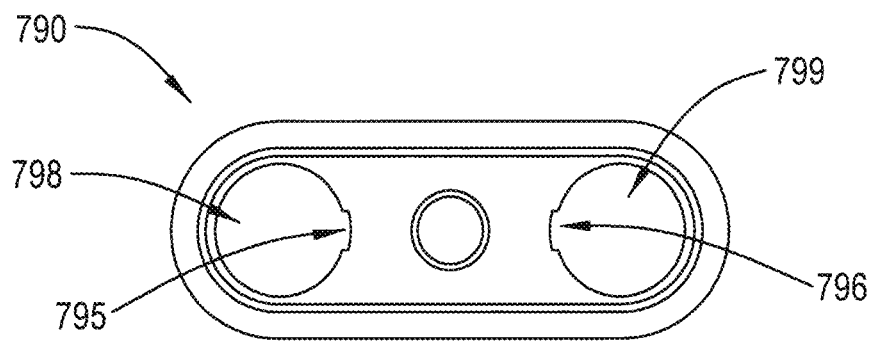
FIG. 23 is a bottom view of the lid of FIG. 21, according to an embodiment of the present disclosure.

With reference to FIG. 21, oblong lid 790 includes a peripheral edge portion 791 sized to be supported on lip 739 (FIG. 20) of top end cap 730 (FIG. 20). As shown in FIGS. 22 and 23, oblong lid 790 includes openings 798 and 799 sized to receive and support upper portions of first water treatment dispenser 760 (FIG. 19) and second water treatment dispenser 770 (FIG. 19), respectively. A first end of the oblong lid may define a first half circle and a first opening operable for supporting the first dispenser coaxially with a center of the first half circle, and a second end of the oblong lid may define a second half circle and a second opening operable for supporting the second dispenser coaxially with a center of the second half circle. First and second water treatment dispensers 760 and 770 (FIG. 19) may be adjustable to regulate the dosing of the water treatment materials into the spa. For example, first and second water treatment dispensers 760 and 770 may include a setting window for adjusting vent openings in the water treatment dispensers.

Figure 24:
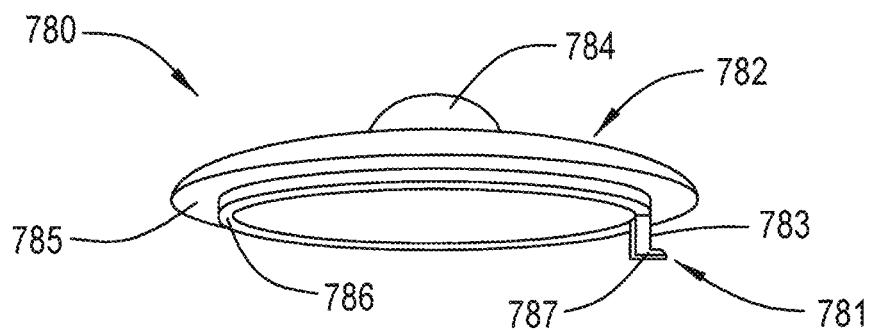
FIG. 24 is a perspective bottom view of a cover for use with the lid of FIGS. 22 and 23, according to an embodiment of the present disclosure.

Lid 790 defining opening 798 and 799 may include cutouts 795 and 796, respectively. As shown in FIG. 24, a cover 780 may include a body 782. Body 782 may have a circular disc shape having a raised tab or handle 784, and a downwardly-depending ring 786. The bottom peripheral edge portion 785 of cap 780 may be sized to rest on upper surface 739 (FIG. 20) of oblong lid 790 (FIG. 22). A catch 781 include a downwardly-extending portions 783 and an outwardly-extending portion 787. Outwardly-extending portion 787 is receivable in cutout 795 or 796 (FIG. 22). Upon rotating raised tab or handle 784, cover 780 is releasably secured to oblong lid 790 (FIG. 22).

With reference again to FIG. 19, reconfigurable spa filter treatment system 700 may be disposed in a first configuration in a filter housing of a spa or hot tub. For example, in the first configuration, first water treatment dispenser 760 may have a tapered cylindrical body, the upper portion of which is sized larger than the diameter of opening 798 in oblong lid 790. Second water treatment dispenser 770 may have a tapered cylindrical body, the upper portion of which is sized larger than the diameter of opening 799 in oblong lid 790. The bottom ends of the first and second water treatment dispensers may be disposed above and spaced from the bottom of chamber 722 (FIG. 20) of filter cartridge 720. For example, the first and second water treatment dispenser may be disposed primarily in the upper half or entirely in the upper half to chamber 722 (FIG. 20) of filter cartridge 30. In the first configuration with first and second water treatment dispensers 760 and 770 shown in FIG. 19, a supply of water is passed from spa or hot tub into a filter housing and through filter medium 750 of the filter cartridge so that the first water treatment dispenser 760 and second water treatment dispenser 770 are disposed in the filtered water in chamber 722 (FIG. 20) of filter cartridge 720 to dispense the first and second water treatment materials from first water treatment dispenser 760 and second water treatment dispenser 770. A supply of treated filtered water from a lower end of filter cartridge 720 is returned to the spa or hot tub.

It will be appreciated that when one or more of the water treatment dispensers are not needed, for example, based on testing of the water in the spa of hot tub, the one or more water treatment dispensers may be removed from the filter cartridge that is disposed in a filter housing of the spa. For example, reconfigurable spa filter treatment system 700 may include one or more covers 780 that may be used for covering the one or more openings in the oblong lid 790 when a water treatment dispenser is not needed or required, for example, based on testing of the water in the spa or hot tub.

With reference still to FIG. 19, when the second water treatment material is not needed but the first water treatment material is needed for treating the water in the spa or hot tub, for example, as determined by testing the water in the spa or hot tub, second water treatment dispenser 780 may be removed from oblong lid 790, a first cap 780 (FIG. 24) may be positioned over second opening 799 (FIG. 22) in oblong lid 790. In operation of reconfigurable spa filter treatment system 700 such as in this second configuration with first water treatment dispenser 760 and cap 80 (FIG. 24), a supply of water is passed from the spa or hot tub into the filter housing and through the filter medium 750 of filter cartridge 720 so that first water treatment dispenser 760 is disposed in the filtered water in the chamber of filter cartridge 720 to dispense the first water treatment material from first water treatment dispenser 760. A supply of treated filtered water from a lower end of filter cartridge 720 is returned to the spa or hot tub.

Where the first water treatment material is not needed in the spa or hot tub but the second water treatment material is needed, for example, as determined by testing the water in the spa or hot tub, first water treatment dispenser 760 may be removed from oblong lid 790, a cap 780 (FIG. 24) may be positioned over second opening 799 (FIG. 22) in oblong lid 790. In operation of reconfigurable spa filter treatment system 700 such as in this third configuration with second water treatment dispenser 770 and cap 780, a supply of water is passed from the spa or hot tub into the filter housing and through filter medium 750 of filter cartridge 720 so that second water treatment dispenser 770 is disposed in the filtered water in the chamber of filter cartridge 720 to dispense second water treatment material from second water treatment dispenser 770. A supply of treated filtered water from a lower end of filter cartridge 720 is returned to the spa or hot tub.

Figure 25:
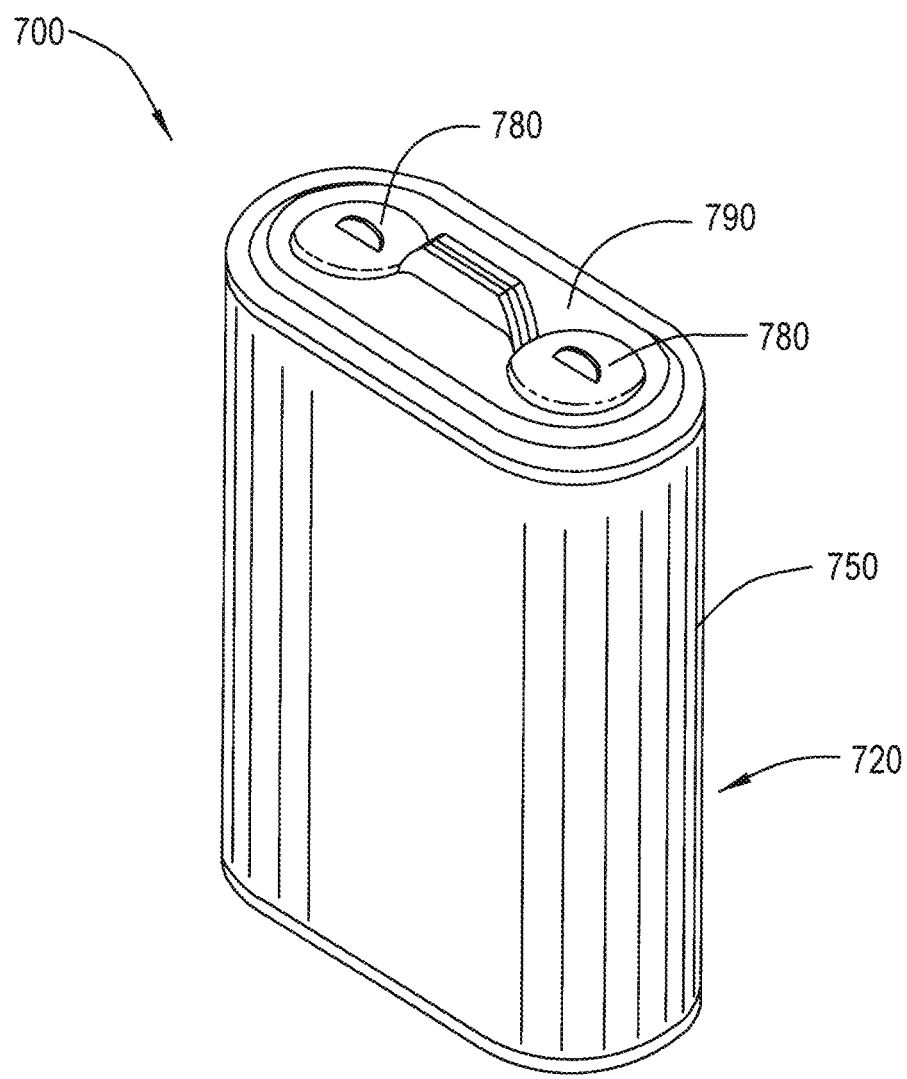
FIG. 25 is a top perspective view of the reconfigurable spa filter treatment system of FIG. 19 in another configuration, according to an embodiment of the present disclosure.

As shown in FIG. 25, where neither the first nor second water treatment materials is needed in the spa or hot tub, for example, as determined by testing the water in the spa or hot tub, first water treatment dispenser 760 (FIG. 19) and second water treatment dispenser 770 (FIG. 19) may be removed from oblong lid 790, a first cap 780 (FIG. 24) may be positioned over first opening 798 (FIG. 22) in oblong lid 790, and a second cap 780 (FIG. 24) may be positioned over second opening 799 (FIG. 22) in oblong lid 790. In operation of reconfigurable spa filter treatment system 700 such as in this fourth configuration with covers 780, a supply of water is passed from the spa or hot tub into the filter housing and through filter medium 750 of filter cartridge 720. A supply of untreated filtered water from a lower end of filter cartridge 720 is returned to the spa or hot tub. In this configuration, the reconfigurable spa filter treatment system acts as a conventional filter cartridge filtering water in the spa.

Figure 26:
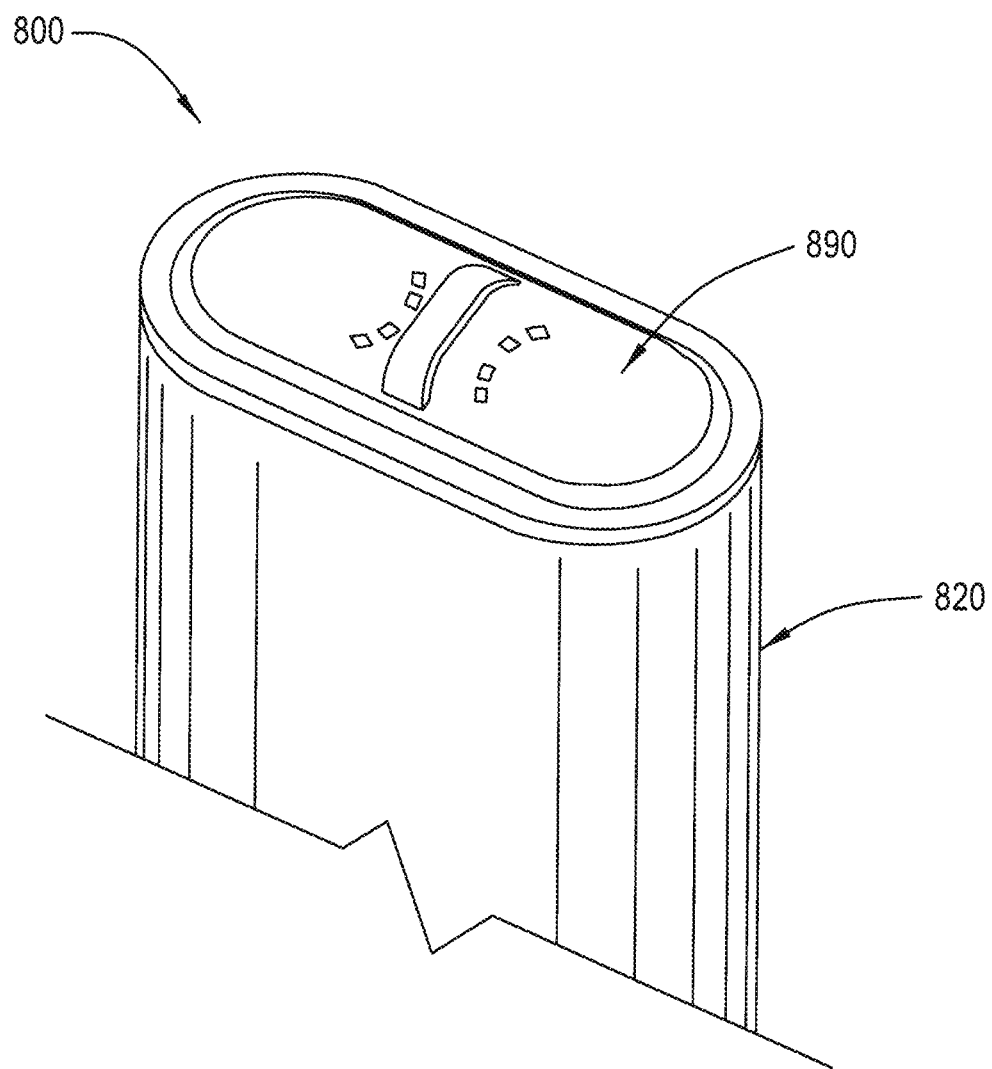
FIG. 26 is a partial top perspective view of a reconfigurable spa filter treatment system, according to an embodiment of the present disclosure.
Figure 27:
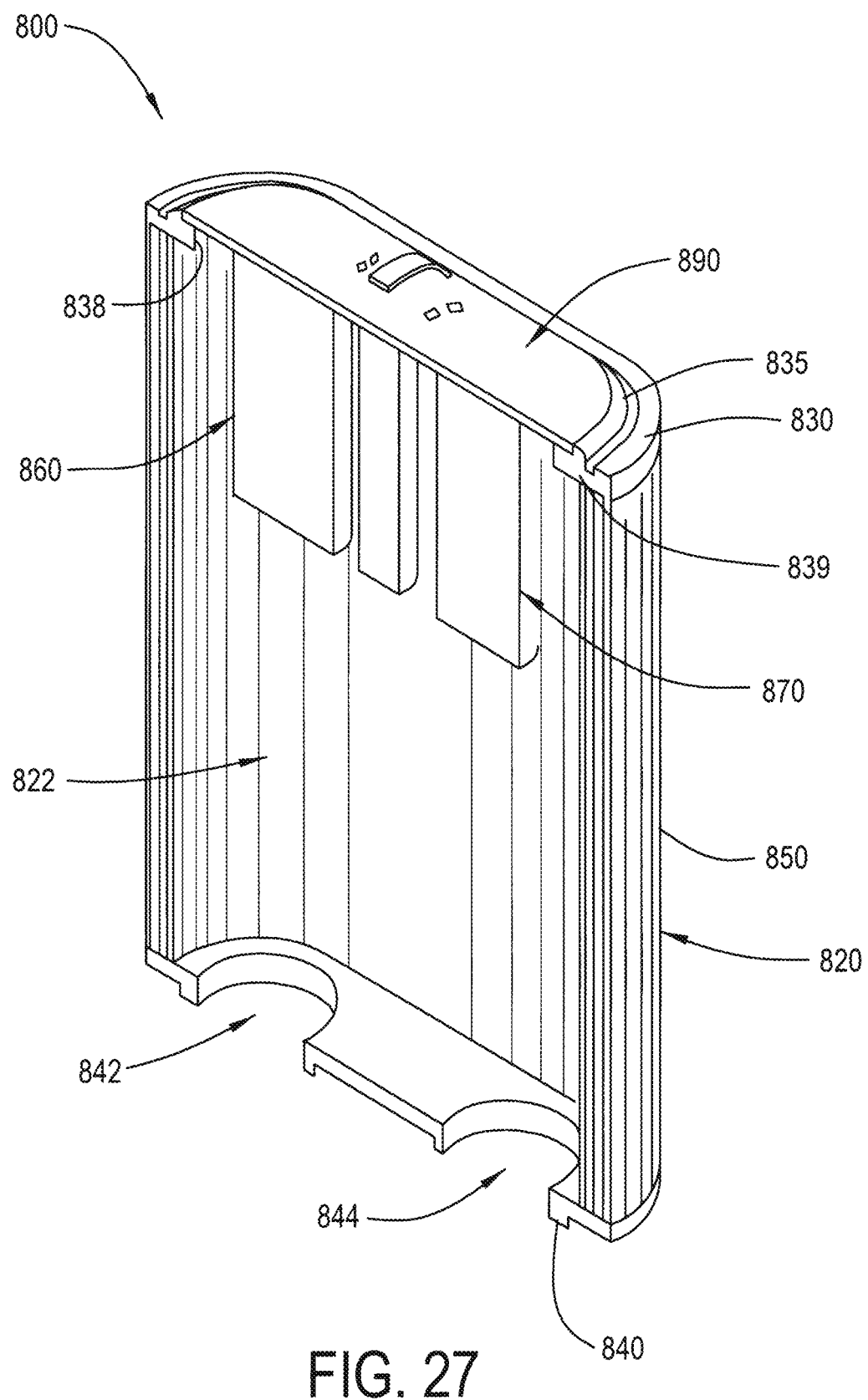
FIG. 27 is a cross-sectional perspective view of the reconfigurable spa filter treatment system of FIG. 26, according to an embodiment of the present disclosure.

Referring now to FIGS. 26 and 27, therein illustrated is a reconfigurable spa filter treatment system 800, according to an embodiment of the present disclosure. In this illustrated embodiment, reconfigurable spa filter treatment system 800 generally includes a filter cartridge 820, an oblong lid 890, a first water treatment dispenser 860 (FIG. 27), and a second water treatment dispenser 870 (FIG. 27). Reconfigurable spa filter treatment system 800 is disposable in a skimmer or filter housing of a spa or hot tub (not shown in FIGS. 26 and 27) for filtering and treating water.

With reference to FIG. 27, in this exemplary embodiment, first water treatment dispenser 860 may include a first water treatment material, and second water treatment dispenser 870 may include a second water treatment material. In some embodiments, the first water treatment material may be different from the second water treatment material. For example, the first water treatment material may be a sanitizing material containing bromine as an active ingredient, and the second water treatment material may be a mineral material containing silver as an active ingredient. In some embodiments, first water treatment dispenser 860 and second water treatment dispenser 870 may be refillable or disposable prefilled water treatment dispensers, such as water treatment mineral dispenser and water treatment sanitizer dispensers.

As shown in FIG. 27, in this illustrated embodiment, filter cartridge 820 may include an oblong top end cap 830, an oblong bottom end cap 840, and a surrounding filter medium 850 disposed between a peripheral portion of top end cap 830 and a peripheral portion of bottom end cap 840. For example, surrounding filter medium 850 may be a pleated filter medium. Oblong top end cap 830, oblong bottom end cap 840, and surrounding filter medium 850 of filter cartridge 820 may define an elongate oblong chamber 822 therein. Top end cap 830 includes an oblong opening 838 extending from a top surface of top end cap 830 to a lower surface of top end cap 830 and into oblong chamber 822. A raised ridge 835 may be spaced from and disposed around opening 838 to define an inwardly-extending lip 839. The bottom end cap 840 may include a first opening 842 extending from a bottom surface to a top surface of bottom end cap 840 and into oblong chamber 822, and a second opening 844 extending from a bottom surface to a top surface of bottom end cap 840 and into oblong chamber 822 With reference to FIG. 28, oblong lid 890 includes a peripheral edge portion 891 sized to be supported on lip 890 of top end cap 830. Oblong lid 890 may include a supporting structure for suspending first water treatment dispenser 860 and second water treatment dispenser 870. For example, oblong lid 890 may include a downwardly-depending ring 821 having internal threads that operably attaches to an externally threaded upper end of first water treatment dispenser 860, and a downwardly-depending ring 831 having internal threads that operably attaches to an externally threaded upper end of second water treatment dispenser 870. It will be appreciated that other means for attachment such as snap fit connector may be employed. In some embodiment, the oblong lid may be fixedly attached forming a disposable dispenser unit. A third water treatment material or disperser 875 may be disposed between the first and second water treatment dispensers and attached to a third support structure 833. Such a third water treatment material or dispenser may include water balancers, spa fragrances, materials for adjusting ph or alkalinity, or other suitable materials.

It will be appreciated that reconfigurable spa filter treatment system 800 may be configurable in different configurations for treating and not treating water in a spa or hot tub. For example, a first configuration may include both first water treatment dispenser 860 and second water treatment dispense 870, a second configuration may include first water treatment dispenser 860 without second water treatment dispense 870, a third configuration may include second water treatment dispenser 870 without first water treatment dispense 860, and a fourth configuration without both first water treatment dispenser 860 and second water treatment dispense 870. The operation of these configuration may be the same as described above.

Figure 28:
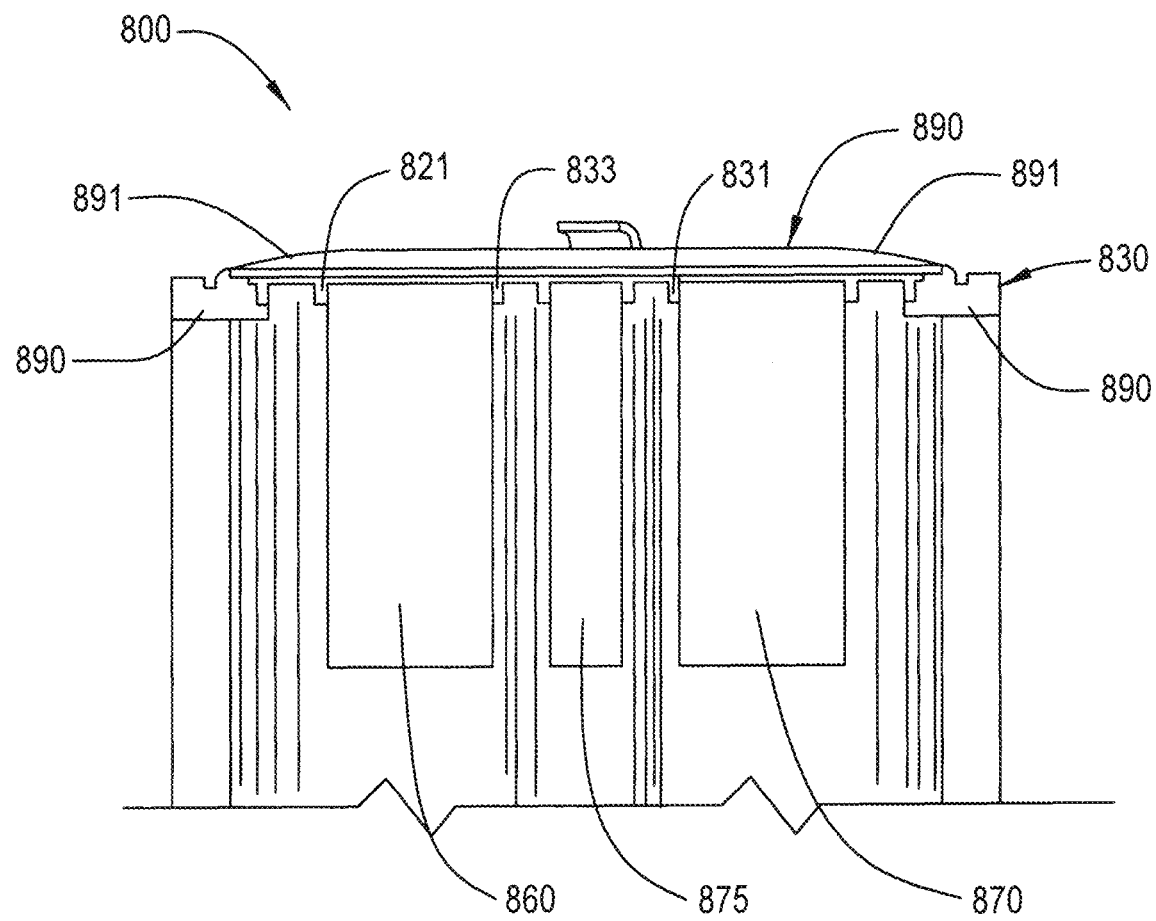
FIG. 28 is an enlarged, cross-sectional, side elevational view of the reconfigurable spa filter treatment system of FIG. 26, according to an embodiment of the present disclosure.
Figure 29:
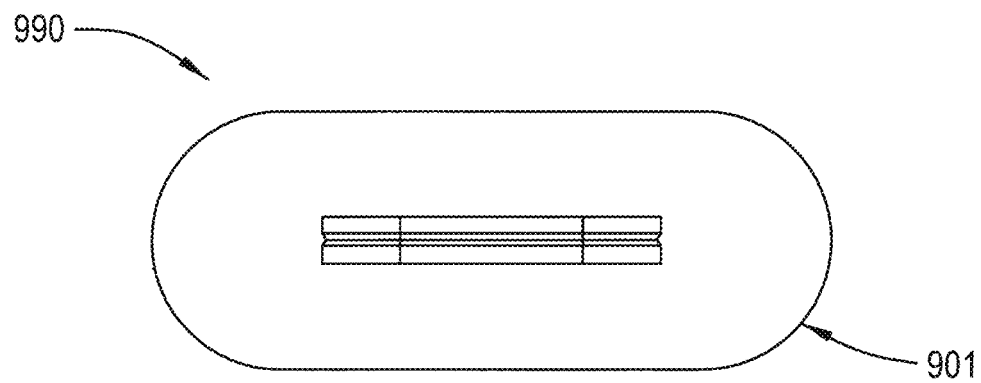
FIG. 29 is a top view of a lid for a reconfigurable spa filter treatment, according to an embodiment of the present disclosure.
Figure 30:
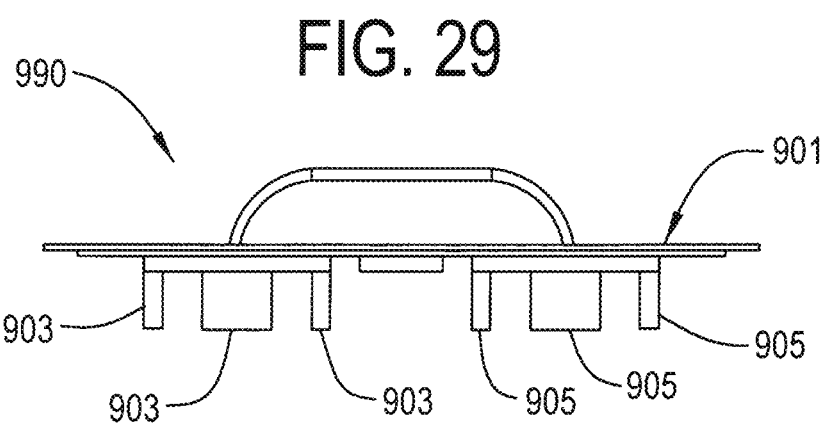
FIG. 30 is a side elevational view of the lid of FIG. 29, according to an embodiment of the present disclosure.
Figure 31:
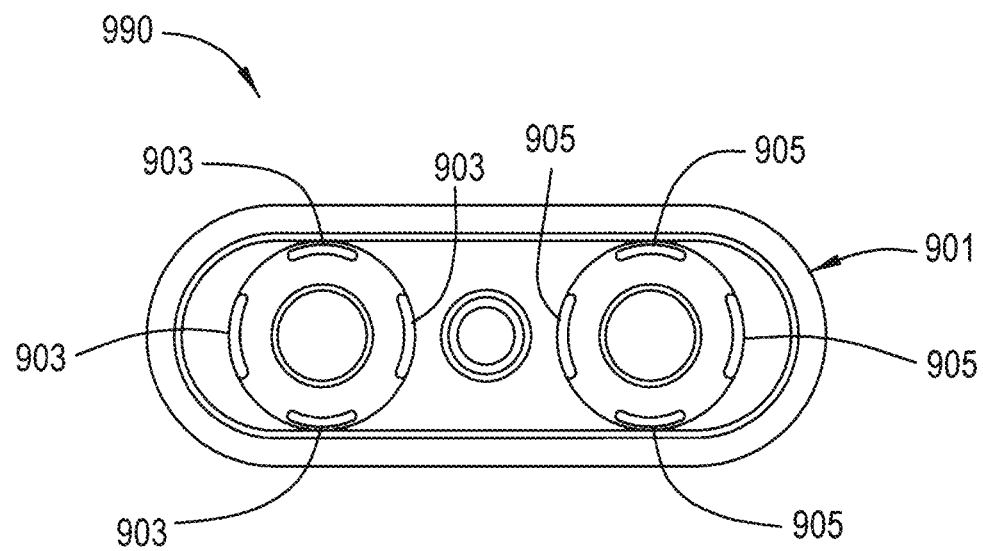
FIG. 31 is a bottom view of the lid of FIG. 29, according to an embodiment of the present disclosure.
Figure 32:
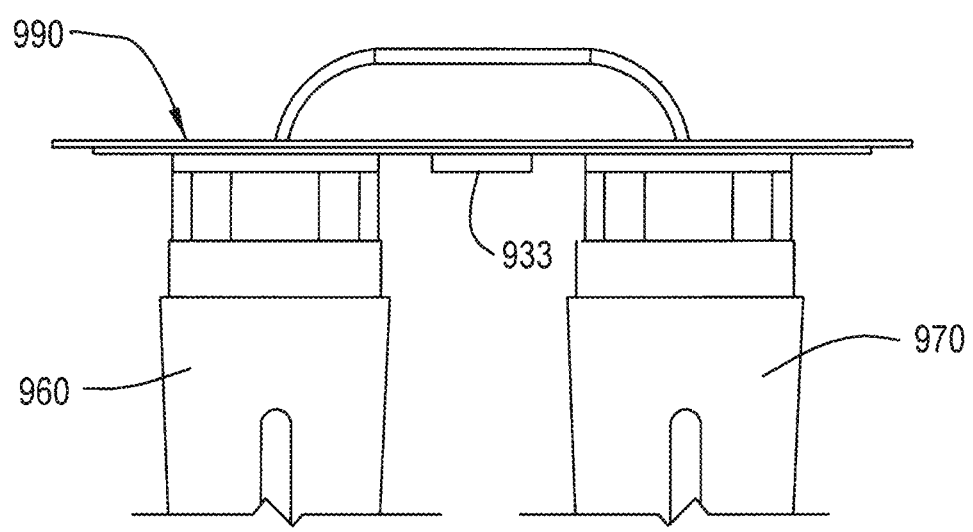
FIG. 32 is a side elevational view of the lid of FIG. 29 along with a first water treatment dispenser and a second water treatment dispenser, according to an embodiment of the present disclosure.

With reference to FIGS. 29-33 therein illustrated is an oblong lid 990 having an oblong body 901 with a peripheral edge portion sized to be supported on, for example, lip 890 (FIG. 28) of top end cap 830 (FIG. 28). Oblong lid 990 may include a supporting structure for suspending a first water treatment dispenser and a second water treatment dispenser. For example, oblong lid 990 may include a plurality of downwardly-depending resilient arms 903 and 905 (FIGS. 30 and 31) that as shown in FIG. 32 operably attach to an upper portion of a first water treatment dispenser 960, and an upper portion of a second water treatment dispenser 970. A third support structure 933 may be operable for supporting a third water treatment material or disperser disposed between the first and second water treatment dispensers. Such a third water treatment material or dispenser may include water balancers, spa fragrances, materials for adjusting ph or alkalinity, or other suitable materials.

It will be appreciated that reconfigurable spa filter treatment system 800 may be configurable in different configurations for treating and not treating water in a spa or hot tub. For example, reconfigurable spa filter treatment system 800 may be disposable in a first configuration with both first water treatment dispenser 860 and second water treatment dispense 870, in a second configuration with first water treatment dispenser 860 and without second water treatment dispense 870, in a third configuration with second water treatment dispenser 870 and without first water treatment dispense 860, and in a fourth configuration without both first water treatment dispenser 860 and second water treatment dispense 870. The operation of these configuration in the skimmer or filter housing of a spa or hot tub may be the same as described above.

Figure 34:
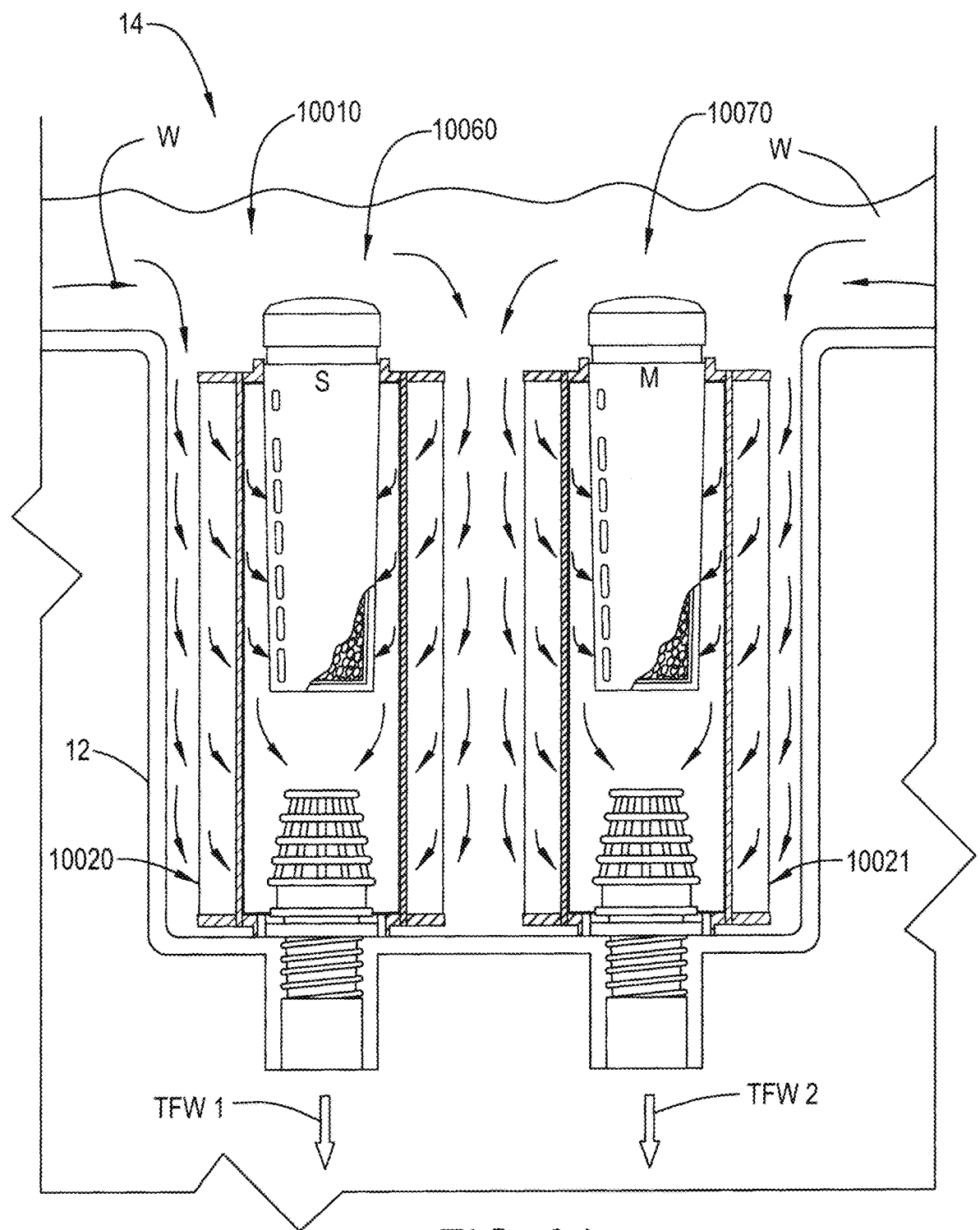
FIG. 34 is a side elevational view, in part cross-section, of the reconfigurable spa filter treatment system disposed the skimmer or filter housing, according to an embodiment of the present disclosure.

With reference to FIG. 34, therein illustrated is a reconfigurable spa filter treatment system 10010 disposed in a first configuration, according to an embodiment of the present disclosure. In this illustrated embodiment, reconfigurable spa filter treatment system 10010 generally includes a first filter cartridge 10020, a first water treatment dispenser 10060 disposed in first filter cartridge 10020, a second filter cartridge 10021, and a second water treatment dispenser 10070 disposed in second filter cartridge 10021. In this illustrated embodiment, first filter cartridge 10020 and second filter cartridge 10021 may be side-by-side filter cartridges having circular cross-sections. The reconfigurable spa filter treatment system 10010 is disposable in a skimmer or filter housing 12 of a spa or hot tub 14 for filtering and treating water.

First water treatment dispenser 10060 may be essentially the same as first water treatment dispenser 60 (FIG. 6), and second water treatment dispenser 10070 may be essentially the same as second water treatment dispenser 70 (FIG. 6). In some embodiments, the first water treatment material may be different from the second water treatment material. For example, the first water treatment material may be a sanitizing material containing bromine as an active ingredient, and the second water treatment material may be a mineral material containing silver as an active ingredient. In some embodiments, first water treatment dispenser 10060 and second water treatment dispenser 10070 may be conventional disposable prefilled cartridges, such as mineral cartridges and sanitizer cartridges. Suitable first and second water treatment dispensers may include the first cartridge dispenser and second cartridge dispenser described and shown in U.S. Pat. No. 7,060,190, issued to King et al., the subject matter being incorporated herein by reference in its entirety.

In this illustrated embodiment, first filter cartridge 10020 may include a circular or disc-shaped top end cap, a circular or disc-shaped bottom end cap, and a surrounding filter medium disposed between a peripheral portion of top end cap and a peripheral portion of bottom end cap. For example, the surrounding filter medium may be a pleated filter medium. The circular top end cap, the circular bottom end cap, and the surrounding filter medium of the first filter cartridge 10020 may define an elongate cylindrical chamber therein. The top end cap includes a first opening extending from a top surface of the top end cap to a lower surface of the top end cap and into cylindrical chamber. A raised collar may be disposed around the opening. The bottom end cap includes a first opening extending from a bottom surface to a top surface of the bottom end cap and into the cylindrical chamber. The top end cap provides a support structure for water treatment dispenser 10060. For example, the opening in the top end cap is sized to receive and support an upper portion of first water treatment dispenser 10060. Second filter cartridge 10021 may be essentially the same as first filter cartridge 10020. Second filter cartridge 10021 is operable to support an upper portion of second water treatment dispenser 10070. In other embodiments, the first and second filter cartridges may be different. The first water treatment dispenser 10060 may be essentially the same as the first water treatment dispenser 60 (FIG. 6) and the second water treatment dispenser 10070 may be essentially the same as the second water treatment dispenser 70 (FIG. 6) described above.

FIG. 34 illustrates reconfigurable spa filter treatment system 10010 disposed in a first configuration in the skimmer or filter housing 12 of spa or hot tub 14, according to an embodiment of the present. Generally, an embodiment of the operation of reconfigurable spa filter treatment system 10010 such as in the first configuration with first and second water treatment dispensers 10060 and 10070, includes a supply of water W being passed from spa or hot tub 14 into skimmer or filter housing 12 with a first portion of water W passing through the filter medium of the first filter cartridge 10020 and a different second portion of the water W passing through second filter cartridge 10021. A first supply of treated filtered water TFW1 is discharged from a lower end of first filter cartridge 10020, which first treated filter water TFW1 is returned to spa or hot tub 14. A second supply of treated filtered water TFW2 is discharged from a lower end of second filter cartridge 10021, which first treated filter water TFW2 is returned to spa or hot tub 14.

When one or more of the water treatment dispensers are not needed, for example, based to testing of the water in the spa of hot tub, the one or more water treatment dispensers may be removed from their respective first or second filter cartridges that are disposed in the skimmer or filter housing of the spa or hot tub. Reconfigurable spa filter treatment system 10010 may include one or more covers, such as covers 80 described above, that may be used for covering the opening in the first filter cartridge and the opening in the second filter cartridge when one or more of the water treatment dispensers is not needed or required, for example, based on testing of the water in the spa or hot tub. When a dispenser is not used, water is filtered in the filter cartridge and the water is not treated.

For example, in operation of reconfigurable spa filter treatment system 10010 in a second configuration with first water treatment dispenser 10060 and a cover disposed on second filter cartridge 10021 (second water treatment dispenser 10070 removed), a first portion of the supply of water W is passed from the spa or hot tub into the skimmer or filter housing and through the filter medium of first filter cartridge 10020 so that first water treatment dispenser 10060 disposed in the filtered water in the chamber of the first filter cartridge 10020 dispenses the first water treatment material from first water treatment dispenser 10060. The supply of treated filtered water TFW1 from a lower end of first filter cartridge 10020 is returned to the spa or hot tub. A second different portion of supply of water W passed from the spa or hot tub into the skimmer or filter housing and through the second filter medium of second filter cartridge 10021 results in a supply of untreated but filtered water from a lower end of second filter cartridge 10021 that is returned to the spa or hot tub.

In operation of reconfigurable spa filter treatment system 10010 in a third configuration with second water treatment dispenser 10070 and a cover disposed on first filter cartridge 10020 (first water treatment dispenser 10060 removed), a second portion of supply of water W is passed from the spa or hot tub into the skimmer or filter housing and through the filter medium of the second filter cartridge 10021 so that second water treatment dispenser 10070 disposed in the filtered water in the chamber of the second filter cartridge 10021 dispenses the second water treatment material from second water treatment dispenser 10070. A supply of treated filtered water TFW1 from a lower end of second filter cartridge 10021 is returned to the spa or hot tub. A first different portion of the supply of water W passed from the spa or hot tub into the skimmer or filter housing and through the first filter medium of first filter cartridge 10020 results in a supply of untreated but filtered water from a lower end of first filter cartridge 10020 that is returned to the spa or hot tub.

Where neither the first nor second water treatment materials is needed in the spa or hot tub, for example, as determined by testing the water in the spa or hot tub or where water treatment conventionally performed, first water treatment dispenser 10060 may be removed from the upper end of first filter cartridge 10020, a first cover may be positioned over the first opening in the upper end of first filter cartridge 10060, second water treatment dispenser 10070 may be removed from the upper end of second filter cartridge 10021, and a second cover may be positioned over the second opening in the upper end of second filter cartridge 10021. In the operation of reconfigurable spa filter treatment system 10010 such as in this fourth configuration with the covers, a supply of water W is passed from the spa or hot tub into the skimmer or filter housing and a first portion of the supply of water W passes through the filter medium of the first filter cartridge 10020, and different second portion of the supply of water W passes through the filter medium of the second filter cartridge 10021. A supply of untreated filtered water from a lower end of the first filter cartridge 10020 and a supply of untreated filtered water from the lower end of the second filter cartridge 10021 are returned to the spa or hot tub. In this configuration, the reconfigurable spa filter treatment system acts as a conventional filter cartridge filtering water in the spa.

Figure 35:
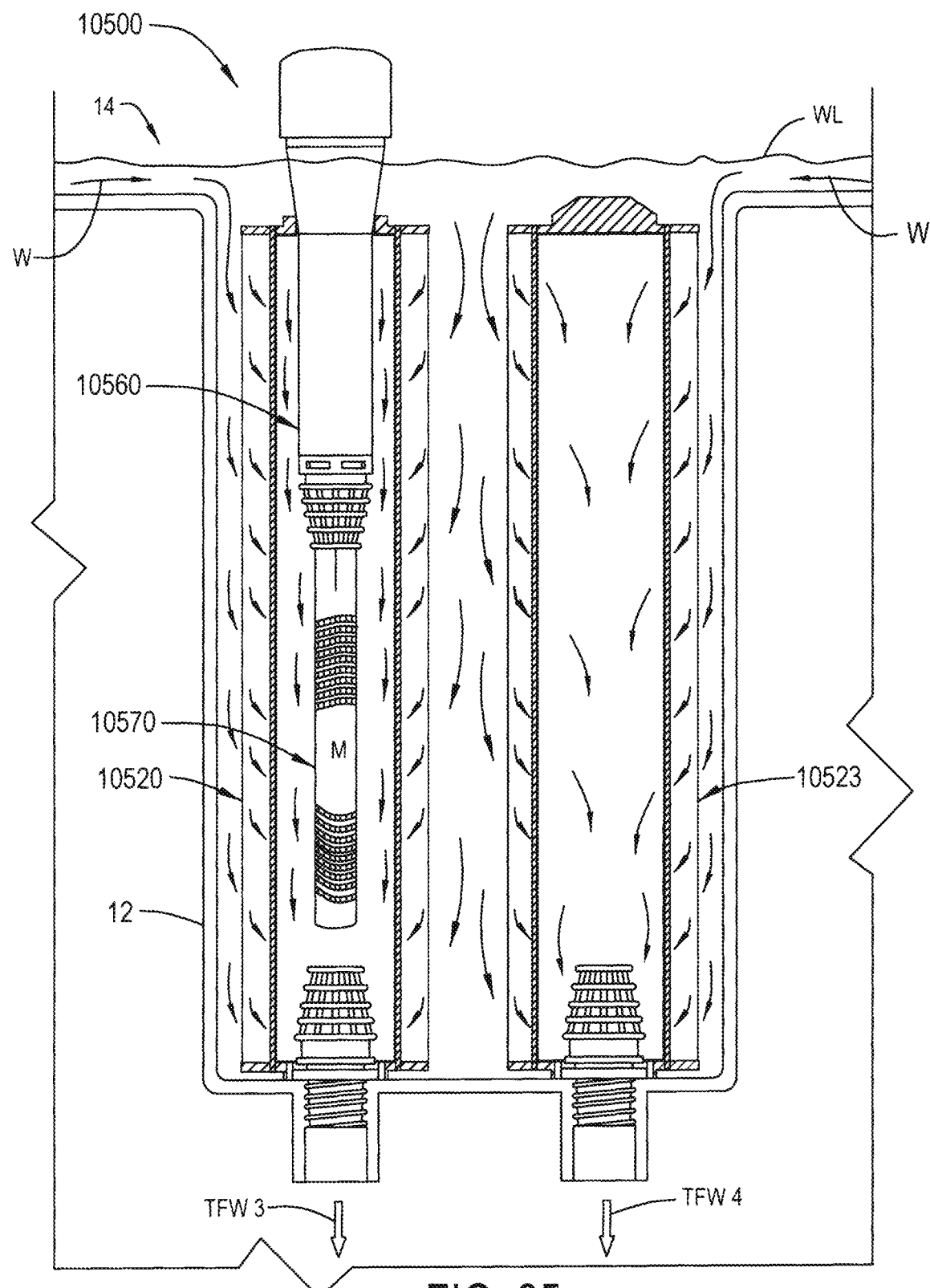
FIG. 35 is a side elevational view, in part cross-section, of a reconfigurable spa filter treatment system disposed the skimmer or filter housing, according to an embodiment of the present disclosure.

FIG. 35 illustrates a reconfigurable spa filter treatment system 10500 operably disposable in a first configuration in a skimmer or filter housing of a spa or hot tub, according to an embodiment of the present. In this illustrated embodiment, reconfigurable spa filter treatment system 10500 generally includes a first filter cartridge 10520, a first water treatment dispenser 10560, a stick water treatment dispenser 10570, and a second conventional filter cartridge 10523. Reconfigurable spa filter treatment system 10500 is disposable in the filter housing of the spa or hot tub for filtering and treating water in the spa or hot tub.

In this illustrated embodiment, first filter cartridge 10520 may have a circular cross-section with an upper opening and a lower opening, and may be essentially configured the same as first filter cartridge 10020 (FIG. 34) or second filter cartridge 10021 (FIG. 34). Second cartridge 10523 may be a conventional filter cartridge having a circular cross-section with a solid top with a handle and a lower opening.

First water treatment dispenser 10560 may include a first water treatment material, and stick water treatment dispenser 10570 may include a second water treatment material different from first water treatment material. In some embodiments, the first water treatment material may be a sanitizing material containing bromine as an active ingredient, and the second water treatment material may be a mineral material containing silver as an active ingredient. In some embodiments, the stick water treatment dispenser may be a Nature2 SPA Stick Mineral sanitizer, available from Zodiac Pool Systems, Inc., of Vista, Calif., containing silver as an active ingredient.

In operation of reconfigurable spa filter treatment system 10010 in one configuration, such as shown in FIG. 35, with first water treatment dispenser 10560 and second water treatment dispenser 10570, a first portion of the supply of water W is passed from the spa or hot tub into the skimmer or filter housing and through the filter medium of first filter cartridge 10520 so that first water treatment dispenser 10560 disposed in the filtered water in the chamber of the first filter cartridge 10520 dispenses the first water treatment material from first water treatment dispenser 10060, and so that second water treatment dispenser 10570 disposed in the filtered water in the chamber of the first filter cartridge 10520 dispenses the second water treatment material from first water treatment dispenser 10570. The supply of treated filtered water TFW3 from a lower end of first filter cartridge 10520 is returned to the spa or hot tub. A second different portion of the water W passed from the spa or hot tub into the skimmer or filter housing and through the second filter medium of second conventional filter cartridge 10523 results in a supply of untreated but filtered water from a lower end of second conventional filter cartridge 10523 that is returned to the spa or hot tub.

In other embodiments, reconfigurable spa filter treatment systems may include one filter cartridges (e.g., oval filter cartridges having two support openings) or side-by-side filter cartridges (e. g., cylindrical filter cartridges) in which the support openings are operable for receiving and supporting conventional floating water treatment dispensers. For example, the dispenser of the conventional floating water treatment dispenser may be inserted into the filter cartridge with the buoyant portion of the floating system resting on the end cap of the filter cartridge.

Figure 36:
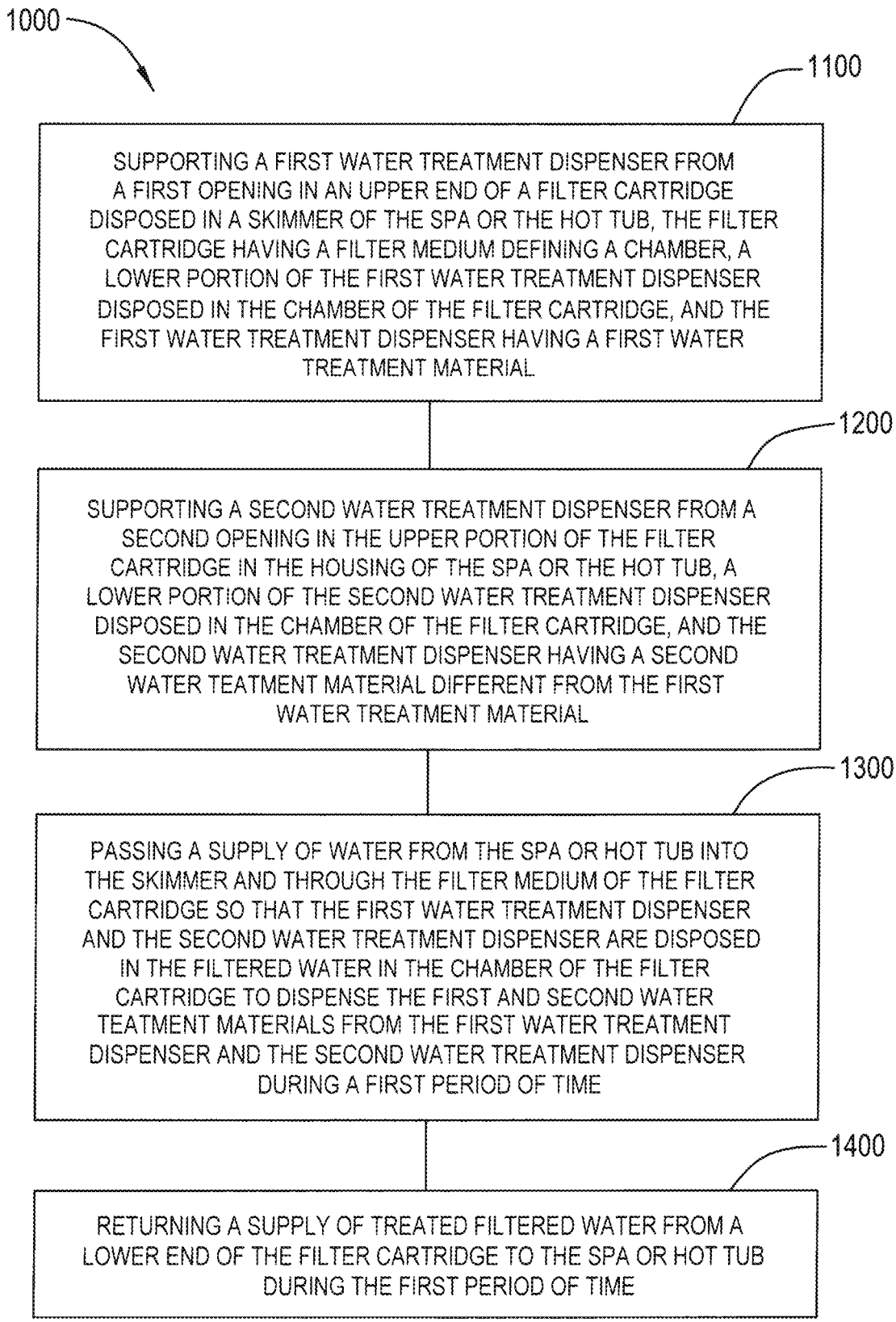
FIG. 36 is a flowchart of a method for treating filtered water in a spa or hot tub, according to an embodiment of the present disclosure.

FIG. 36 illustrates a method 1000 for treating water in a spa or hot tub, according to an embodiment of the present disclosure. In this illustrated embodiment, method 1000 includes, for example, at 1100 supporting a first water treatment dispenser from a first opening in an upper end of a filter cartridge disposed in a filter housing of the spa or the hot tub, the filter cartridge having a filter medium defining a chamber, a lower portion of the first water treatment dispenser disposed in the chamber of the filter cartridge, and the first water treatment dispenser having a first water treatment material, and at 1200, supporting a second water treatment dispenser from a second opening in the upper portion of the filter cartridge in the housing of the spa or the hot tub, a lower portion of the second water treatment dispenser disposed in the chamber of the filter cartridge, and the second water treatment dispenser having a second water treatment material different from the first water treatment material. At 1300, a supply of water is passed from the spa or hot tub into the filter housing and through the filter medium of the filter cartridge so that the first water treatment dispenser and the second water treatment dispenser are disposed in the filtered water in the chamber of the filter cartridge to dispense the first and second water treatment materials from the first water treatment dispenser and the second water treatment dispenser during a first period of time. At 1400 a supply of treated filtered water is returned from a lower end of the filter cartridge to the spa or hot tub during the first period of time.

The method may further include removing the first water treatment dispenser from the upper end of the filter cartridge, supporting a first cap over the first opening in the upper end of the filter cartridge, and passing a supply of water from the spa or hot tub into the filter housing and through the filter medium of the filter cartridge to dispense water treatment material from the second water treatment dispenser during a second period of time. The method may further include removing the second water treatment dispenser from the upper end of the filter cartridge, supporting a first cap over the second opening in the upper end of the filter cartridge, and passing a supply of water from the spa or hot tub into the filter housing and through the filter medium of the filter cartridge to dispense water treatment material from the first water treatment dispenser during a second period of time.

The method may further include removing the first water treatment dispenser from the upper end of the filter cartridge, supporting a first cap over the first opening in the upper end of the filter cartridge, removing the second water treatment dispenser from the upper end of the filter cartridge, supporting a second cap over the second opening in the upper end of the filter cartridge, passing a supply of water from the spa or hot tub into the filter housing and through the filter medium of the filter cartridge during a second period of time, and discharging a supply of untreated filtered water from the lower end of the filter cartridge and into the spa or hot tub during the second period of time.

Figure 37:
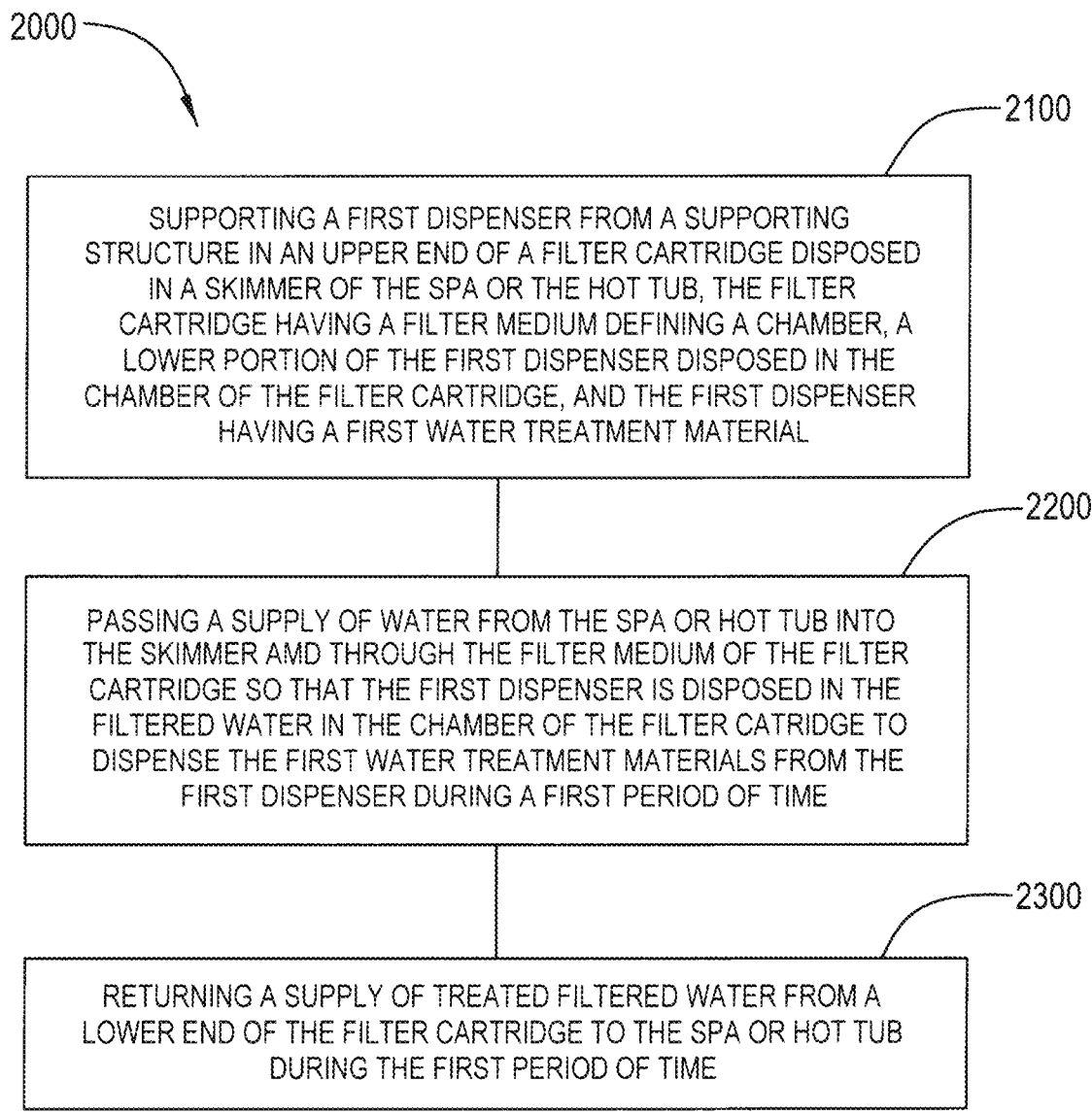
FIG. 37 is a flowchart of a method for treating filtered water in a spa or hot tub, according to an embodiment of the present disclosure.

FIG. 37 illustrates a method 2000 for treating water in a spa or hot tub, according to an embodiment of the present disclosure. In this illustrated embodiment, method 2000 includes, for example, at 2100 supporting a first dispenser from a supporting structure in an upper end of a filter cartridge disposed in a skimmer of the spa or the hot tub, the filter cartridge having a filter medium defining a chamber, a lower portion of the first dispenser disposed in the chamber of the filter cartridge, and the first dispenser having a first water treatment material, at 2200 passing a supply of water from the spa or hot tub into the skimmer and through the filter medium of the filter cartridge so that the first dispenser is disposed in the filtered water in the chamber of the filter cartridge to dispense the first water treatment materials from the first dispenser during a first period of time, and at 2300 returning a supply of treated filtered water from a lower end of the filter cartridge to the spa or hot tub during the first period of time.

The method may further include removing the first dispenser from the supporting structure of the upper end of the filter cartridge, attaching a stick dispenser having a second water treatment material to the first dispenser, the second water treatment material different from the first water treatment material, supporting the first dispenser and stick dispenser from the supporting structure of the filter cartridge, passing a supply of water from the spa or hot tub into the skimmer and through the filter medium of the filter cartridge so that the first dispenser and the stick dispenser are disposed in the filtered water in the chamber of the filter cartridge to dispense the first water treatment material from the first dispenser and the second water treatment material from the stick dispenser during a second period of time, and returning a supply of treated filtered water from the lower end of the filter cartridge to the spa or hot tub during the second period of time.

The method may further include removing the first dispenser from the upper end of the filter cartridge, supporting a cap over the opening in the upper end of the filter cartridge, and passing a supply of water from the spa or hot tub into the skimmer and through the filter medium of the filter cartridge during a second period of time, and discharging a supply of untreated filtered water from the lower end of the filter cartridge and into the spa or hot tub during the second period of time.

In the various described embodiments of the present disclosure, to aid the user in identifying the water treatment dispensers containing the different water treatment dispensing materials, which may have the same or similar size and shape, may include identifying indicia or different colors. For example, the first water treatment dispenser may have a blue body identifying a mineral dispenser, which yields ions such as silver ions. The second water treatment dispenser may have a yellow body identifying a bromine dispenser, which yields bromine. The color coding permits a user to quickly identify the contents of the water treatment dispenser and the purpose of the cartridge. To replace an empty or spent water treatment dispenser, the user merely removes the spent dispenser from the filter cartridge or lifts the lid out of the filter cartridge with the water treatment dispenser, and secures a new cartridge into position in the filter cartridge or into lid and returning the lid and new water treatment dispenser to the filter cartridge.

It will be appreciated that in the various embodiments of the reconfigurable spa filter treatment systems, the dispenser support structure may have any suitable support structure. For example, the support openings and dispenser may have corresponding shapes. For example, the opening and dispenser may have a square, triangle, oval, symmetric, irregular or other suitable cross-sections. The filter cartridge may have any suitable cross-section such as circular, oval, square, rectangular, symmetric, irregular, etc. For example, the filter may be cylindrical having a circular cross-section with one, two, or more than two openings for supporting various water treatment or other material dispensers. The support opening may correspond to the cross-section of the filter cartridge or be different therefrom. The filter cartridges or lids may have one, two, three, or more support structures such as openings, resilient members, threaded members, snap-fit connectors, friction fit, or other configurations. The lower openings of the circular cross-sectional filter cartridges may include lower keyed openings that allow the filter cartridges to be rotated and locked in the housing of the spa.

It will be appreciated that the first and second water treatment dispensers may include sanitizers, minerals, and/or chemicals. For example, other water treatment materials may include bromine, chlorine, silver, copper, bromine tablets, chlorine tablets, clarifiers, cleaners, granular bromine, granular chlorine, and phosphate remover. Chemicals or water treatment material may be available from Mineraluxe of Markham, Ontario, Canada. The sanitizers, minerals, or chemicals may be in granular and/or solid form.

In some embodiments, the reconfigurable spa filter treatment systems when configured without the one or more dispensers and with the one or more caps, a water treatment dispenser stick with or without a support stem may be dropped into the filter cartridge for treating water in spa. The dispenser may be formed form a plastic or polymeric material.

As may be recognized by those of ordinary skill in the art based on the teachings herein, numerous changes and modifications may be made to the above-described and other embodiments of the present disclosure without departing from the scope of the disclosure. In addition, the devices and apparatus may include more or fewer components or features than the embodiments as described and illustrated herein. Further, the above-described embodiments and/or aspects thereof may be used in combination with each other. Accordingly, this detailed description of the currently-preferred embodiments is to be taken as illustrative, as opposed to limiting the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The disclosure has been described with reference to the preferred embodiments. It will be understood that the architectural and operational embodiments described herein are exemplary of a plurality of possible arrangements to provide the same general features, characteristics, and general apparatus operation. Modifications and alterations will occur to others upon a reading and understanding of the preceding detailed description. It is intended that the disclosure be construed as including all such modifications and alterations.

The invention claimed is:

1. A method for treating water in a spa or hot tub, the method comprising:
   supporting a first water treatment dispenser from a first opening in an upper end of a filter cartridge disposed in a skimmer of the spa or the hot tub, the filter cartridge having a filter medium defining a chamber, a lower portion of the first water treatment dispenser disposed in the chamber of the filter cartridge, and the first water treatment dispenser having a first water treatment material;
   supporting a second water treatment dispenser from a second opening in the upper portion of the filter cartridge in the housing of the spa or the hot tub, a lower portion of the second water treatment dispenser disposed in the chamber of the filter cartridge, and the second water treatment dispenser having a second water treatment material different from the first water treatment material;

passing a supply of water from the spa or hot tub into the skimmer and through the filter medium of the filter cartridge so that the first water treatment dispenser and the second water treatment dispenser are disposed in the filtered water in the chamber of the filter cartridge to dispense the first and second water treatment materials from the first water treatment dispenser and the second water treatment dispenser during a first period of time; and returning a supply of treated filtered water from a lower end of the filter cartridge to the spa or hot tub during the first period of time.

2. The method of claim 1 further comprising removing the first water treatment dispenser from the upper end of the filter cartridge, supporting a first cap over the first opening in the upper end of the filter cartridge, and passing a supply of water from the spa or hot tub into the skimmer and through the filter medium of the filter cartridge to dispense water treatment material from the second water treatment dispenser during a second period of time.

3. The method of claim 1 further comprising removing the first water treatment dispenser from the upper end of the filter cartridge, supporting a first cap over the first opening in the upper end of the filter cartridge, removing the second water treatment dispenser from the upper end of the filter cartridge, supporting a second cap over the second opening in the upper end of the filter cartridge, passing a supply of water from the spa or hot tub into the skimmer and through the filter medium of the filter cartridge during a second period of time, and discharging a supply of untreated filtered water from the lower end of the filter cartridge and into the spa or hot tub during the second period of time.

4. The method of claim 1 wherein the supporting the first water treatment dispenser comprises supporting an upper portion of a disposable prefilled sanitizer dispenser above and from the first opening in the upper portion of the filter cartridge with a lower portion of the disposable prefilled sanitizer water treatment dispenser disposed in the chamber of the filter cartridge, and the supporting the second dispenser comprises supporting an upper portion of a disposable prefilled mineral dispenser above and from the first opening in the upper portion of the filter cartridge with a lower portion of the disposable prefilled mineral dispenser disposed in the chamber of the filter cartridge.

5. The method of claim 4 wherein the first dispenser comprises a first cap having a peripheral edge supportable on the upper end of the filter cartridge surrounding the first opening and a first container fixedly attached to the first cap having the first water treatment material disposed in the chamber of the filter cartridge, and wherein the second dispenser comprises a second cap having a peripheral edge supportable on the upper end of the filter cartridge surrounding the second opening and a second container fixedly attached to the second cap having the second water treatment material disposed in the chamber of the filter cartridge.

6. The method of claim 1 wherein the supporting the first dispenser comprises supporting a first cap having a peripheral edge supportable on the upper end of the filter cartridge surrounding the first opening and a first basket releasably attachable the first cap for receiving the first water treatment material disposed in the chamber of the filter cartridge, and wherein the supporting the second dispenser comprises supporting a second cap having a peripheral edge supportable on the upper end of the filter cartridge surrounding the second opening and a second basket releasably attachable the second cap for receiving the second water treatment material disposed in the chamber of the filter cartridge.

7. The method of claim 6 further comprising:
removing the second dispenser from the upper end of the filter cartridge;
supporting a second cap over the second opening in the upper end of the filter cartridge;
attaching a stick dispenser to the basket of the first dispenser, the stick dispenser having a third water treatment material different from the first water treatment material;
passing a supply of water from the spa or hot tub into the skimmer and through the filter medium of the filter cartridge so that the first dispenser and the stick dispenser are disposed in the filtered water in the chamber of the filter cartridge to dispense the first water treatment material from the first dispenser and the third water treatment material from the stick dispenser during a second period of time; and
returning a supply of treated filtered water from the lower end of the filter cartridge to the spa or hot tub during the second period of time.

8. The method of claim 1 wherein the supporting the first dispenser comprises supporting an upper portion of the first dispenser above a water line in the skimmer of the spa or hot tub and supporting a lower portion in the chamber of the filter cartridge, and the supporting the second dispenser comprises supporting an upper portion of the second dispenser above the water line in the skimmer of the spa or hot tub and supporting a lower portion in the chamber of the filter cartridge.

9. The method of claim 8 wherein the supporting the first dispenser comprises removing a first removable cover disposed above the water line from the upper portion of the first dispenser and passing the first water treatment material through the upper portion and into the lower portion of the first dispenser, and the supporting the second dispenser comprises removing a second removable cover disposed above the water line from the upper portion of the second dispenser and passing the first water treatment material through the upper portion and into the lower portion of the first dispenser.

10. The method of claim 8 further comprising:
removing the second dispenser from the upper end of the filter cartridge;
supporting a second cap over the second opening in the upper end of the filter cartridge;
attaching a stick dispenser to the first dispenser, the stick dispenser having a third water treatment material different from the first water treatment material;
passing a supply of water from the spa or hot tub into the skimmer and through the filter medium of the filter cartridge so that the first dispenser and the stick dispenser are disposed in the filtered water in the chamber of the filter cartridge to dispense the first water treatment material from the first dispenser and the third water treatment material from the stick dispenser during a second period of time; and
returning a supply of treated filtered water from the lower end of the filter cartridge to the spa or hot tub during the second period of time.

11. The method of claim 1 wherein the first dispenser and the second dispenser are disposed entirely above a top half of the filter cartridge.

12. The method of claim 1 wherein the first dispenser comprises a mineral, a mineral comprising silver, a sanitizer, or a sanitizer comprising bromine.

13. A method for treating water in a spa or hot tub, the method comprising:
   supporting a first dispenser from a supporting structure having an opening in an upper end of a filter cartridge disposed in a skimmer of the spa or the hot tub, the filter cartridge having a filter medium defining a chamber, a lower portion of the first dispenser disposed in the chamber of the filter cartridge, and the first dispenser having a first water treatment material;
   passing a supply of water from the spa or hot tub into the skimmer and through the filter medium of the filter cartridge so that the first dispenser is disposed in the filtered water in the chamber of the filter cartridge to dispense the first water treatment material from the first dispenser during a first period of time;
   returning a supply of treated filtered water from a lower end of the filter cartridge to the spa or hot tub during the first period of time;
   removing the first dispenser from the upper end of the filter cartridge;
   supporting a cap over the opening in the upper end of the filter cartridge; and
   passing a supply of water from the spa or hot tub into the skimmer and through the filter medium of the filter cartridge during a second period of time, and discharging a supply of untreated filtered water from the lower end of the filter cartridge and into the spa or hot tub during the second period of time.

14. The method of claim 13 wherein the supporting the first dispenser comprises supporting an upper portion of a disposable prefilled dispenser above and from the opening in the upper portion of the filter cartridge with a lower portion of the disposable prefilled disposed in the chamber of the filter cartridge.

15. The method of claim 13 wherein the supporting the first dispenser comprises supporting a cap having a peripheral edge supportable on the upper end of the filter cartridge surrounding the opening and a basket releasably attachable to the cap for receiving the first water treatment material disposed in the chamber of the filter cartridge.

16. A method for treating water in a spa or hot tub, the method comprising:
   supporting a first dispenser from a supporting structure in an upper end of a filter cartridge disposed in a skimmer of the spa or the hot tub, the filter cartridge having a filter medium defining a chamber, a lower portion of the first dispenser disposed in the chamber of the filter cartridge, and the first dispenser having a first water treatment material;
   passing a supply of water from the spa or hot tub into the skimmer and through the filter medium of the filter cartridge so that the first dispenser is disposed in the filtered water in the chamber of the filter cartridge to dispense the first water treatment material from the first dispenser during a first period of time;
   returning a supply of treated filtered water from a lower end of the filter cartridge to the spa or hot tub during the first period of time;
   removing the first dispenser from the supporting structure of the upper end of the filter cartridge;
   attaching a stick dispenser having a second water treatment material to the first dispenser, the second water treatment material different from the first water treatment material;
   supporting the first dispenser and stick dispenser from the supporting structure of the filter cartridge;
   passing a supply of water from the spa or hot tub into the skimmer and through the filter medium of the filter cartridge so that the first dispenser and the stick dispenser are disposed in the filtered water in the chamber of the filter cartridge to dispense the first water treatment material from the first dispenser and the second water treatment material from the stick dispenser during a second period of time; and
   returning a supply of treated filtered water from the lower end of the filter cartridge to the spa or hot tub during the second period of time.

17. The method of claim 16 wherein the first dispenser comprises a mineral or a sanitizer, and the stick dispenser comprises a mineral or a sanitizer.

18. The method of claim 16 wherein the supporting structure comprises an opening in the upper end of the filter cartridge.

19. A reconfigurable spa filter system receivable in a skimmer of a spa or hot tub for use in treating water in a spa or hot tub, the system comprising:
   a filter cartridge having an upper portion, a bottom portion, and a surrounding filter medium disposed between a periphery of said upper portion and a periphery of said bottom portion to define a chamber therein;
   said upper portion having a first dispenser supporting structure for supporting a first dispenser having a first water treatment material in said chamber of said filter cartridge;
   said upper portion having a second dispenser supporting structure for supporting a second dispenser having a second water treatment material different from the first water treatment material in said chamber of said filter cartridge; and
   wherein when water from the spa or hot tub is directed into the skimmer and through said filter medium of said filter cartridge, the first dispenser and the second dispenser disposed in the filtered water in the chamber of the filter cartridge are operable to dispense the first and second water treatment materials from the first dispenser and the second dispenser, which treated filtered water is discharged from a lower end of the filter cartridge and into the spa or hot tub during a first period of time.

20. The system of claim 19 wherein said first dispenser supporting structure comprises a first opening extending through said upper portion, and said second dispenser supporting structure comprises a second opening extending through said upper portion, and further comprising:
   a first cap having a top surface and a bottom surface, and said first cap having a peripheral portion supportable across said first opening of said upper portion; and
   a second cap having a top surface and a bottom surface, and said second cap supportable across said first opening of said upper portion.

21. The system of claim 19 wherein said upper portion of said filter cartridge comprises a top end cap, said first dispenser supporting structure comprises a first opening extending through said top end cap, and said second dispenser supporting structure comprises a second opening extending through said top end cap.

22. The system of claim 19 wherein said upper portion of said filter cartridge comprises a top end cap having an oblong opening, and further comprising a lid supportable across said oblong opening of said top end cap, said lid defining said first dispenser supporting structure and said second dispenser supporting structure.

23. The system of claim 19 further comprising:
said first dispenser comprising a first cap and a first basket releasably attachable said first cap for receiving the first water treatment material disposable in said chamber of said filter cartridge, said first dispenser supporting structure operable to support said first cap with said basket disposed in said chamber of said skimmer; and
said second dispenser comprising a second cap and a second basket releasably attachable said second cap for receiving the second water treatment material disposable in said chamber of said filter cartridge, said first dispenser supporting structure operable to support said first cap with said basket disposed in said chamber of said skimmer.

24. The system of claim 23 wherein said first basket is fixedly attachable to said first cap, and said second basket is fixedly attachable to said second cap.

25. The system of claim 23 wherein said first basket comprise a support structure for supporting a stick dispenser, and said second basket comprise a support structure for supporting a stick dispenser.

26. The system of claim 19 further comprising:
said first dispenser comprising a hollow portion having an upper portion sized to rest on a portion of said first dispenser supporting structure, and a second portion sized to extend through said first dispenser supporting structure, a first removable cover attachable to said upper end of said upper portion of said first dispenser, and a first basket attached to said lower portion of said first dispenser; and
said second dispenser comprising a hollow portion having an upper portion sized to rest on a portion of said second dispenser supporting structure, and a second portion sized to extend through said second dispenser supporting structure, a second removable cover attachable to said upper end of said upper portion of the second dispenser, and a second basket attached to said lower portion of said second dispenser; and
wherein said first removable cover and said second removable cover being disposable above a water line in the skimmer allowing a user to add the first and second water treatment material without removal of said first and said second dispensers.

27. The system of claim 26 wherein said first basket comprise a support structure for supporting a stick dispenser, and said second basket comprise a support structure for supporting a stick.

28. The system of claim 19 further comprising the spa or hot tub, and said system being receivable in a skimmer in the spa or the hot tub.

\* \* \* \* \*